US012760823B2

(12) United States Patent
Morimura et al.

(10) Patent No.: US 12,760,823 B2
(45) Date of Patent: Oct. 13, 2026

(54) ATTACHMENT DEVICE AND METHOD FOR ATTACHING AND DETACHING INFORMATION ACQUISITION DEVICE

(71) Applicant: Kubota Corporation, Osaka (JP)

(72) Inventors: Masaru Morimura, Amagasaki (JP); Maiko Nishino, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 9 days.

(21) Appl. No.: 19/191,107

(22) Filed: Apr. 28, 2025

(65) Prior Publication Data

US 2025/0251067 A1 Aug. 7, 2025

Related U.S. Application Data

(63) Continuation of application No. PCT/JP2023/037332, filed on Oct. 16, 2023.

(30) Foreign Application Priority Data

Nov. 2, 2022 (JP) ................................ 2022-176369

(51) Int. Cl.
*F16L 33/22* (2006.01)
*F16L 37/252* (2006.01)
*F16L 55/00* (2006.01)

(52) U.S. Cl.
CPC ............... *F16L 33/22* (2013.01); *F16L 55/00* (2013.01)

(58) Field of Classification Search
CPC . F16L 33/22; F16L 55/00; F16L 55/07; F16L 37/113; F16L 37/252; F16L 37/248; F16L 37/107; F16L 41/008
See application file for complete search history.

(56) References Cited

U.S. PATENT DOCUMENTS 1,885,321 A * 11/1932 Benn ..................... F16L 37/248 285/361
1,913,971 A * 6/1933 Benn ....................... F16L 37/46 285/361
2,076,918 A * 4/1937 Robison ................ F16L 37/248 285/82
2,245,847 A * 6/1941 Bagby ................... F16L 37/252 285/361
2,450,527 A * 10/1948 Smith ................... F16L 37/248 285/361
3,100,655 A * 8/1963 Work .................... F16L 37/252 285/401

(Continued)

FOREIGN PATENT DOCUMENTS

JP S6362754 U 4/1988

*Primary Examiner* — Aaron M Dunwoody
(74) *Attorney, Agent, or Firm* — Keating & Bennett, LLP

(57) ABSTRACT

An attachment device capable of attaching an information acquisition device to acquire information in a pipe conduit through which a fluid flows, the attachment device including a mount, a holder, and a restriction jig including a first mount restriction portion to engage with the mount to restrict relative movement in a direction of axis with respect to the mount, and a second mount restriction portion to restrict relative movement in a rotational direction, and the first and second mount restriction portions are engageable with the mount by relatively moving the restriction jig in the rotational direction with respect to the mount.

16 Claims, 13 Drawing Sheets

(56) References Cited

U.S. PATENT DOCUMENTS

| | | | | | |
|---|---|---|---|---|---|
| 3,345,711 | A * | 10/1967 | Mccarthy | F16L 37/252 | 403/321 |
| 3,364,455 | A * | 1/1968 | Nodfelt | H01R 13/625 | 439/314 |
| 5,741,084 | A * | 4/1998 | Del Rio | A61B 17/1633 | 285/376 |
| 6,206,433 | B1 * | 3/2001 | Bloomer | F02M 35/10354 | 285/82 |
| 7,731,243 | B2 * | 6/2010 | Tiberghien | F16L 37/34 | 285/402 |
| 2003/0085574 | A1 * | 5/2003 | Froment | F16L 37/084 | 285/376 |
| 2007/0274772 | A1 * | 11/2007 | Tiberghien | F16L 37/107 | 403/300 |
| 2018/0252052 | A1 * | 9/2018 | Attiwell | E21B 17/042 | |
| 2025/0251067 | A1 * | 8/2025 | Morimura | F16L 33/22 | |

* cited by examiner

ATTACHMENT DEVICE AND METHOD FOR ATTACHING AND DETACHING INFORMATION ACQUISITION DEVICE

CROSS REFERENCE TO RELATED APPLICATIONS

This application claims the benefit of priority to Japanese Patent Application No. 2022-176369 filed on Nov. 2, 2022 and is a Continuation Application of PCT Application No. PCT/JP2023/037332 filed on Oct. 16, 2023. The entire contents of each application are hereby incorporated herein by reference.

BACKGROUND OF THE INVENTION

1. Field of the Invention

The present invention relates to attachment devices to each of which an information acquisition device to acquire information in a pipe conduit through which a fluid flows can be attached, and methods for attaching and detaching the information acquisition devices.

2. Description of the Related Art

There has conventionally been known a technique of a device for acquiring information in piping. For example, Japanese Utility Model Application Laid-Open No. 63-62754 discloses a pipe inspection device that can inspect a pipe without stopping water flow in the pipe. The pipe inspection device can insert an inspection rod for inspecting the inside of a pipe into a hole formed in the middle of a pipe conduit. The inspection rod is attached to a through flange provided to communicate with the hole.

In the pipe inspection device that can inspect a pipe without stopping water flow in the pipe described in Japanese Utility Model Application Laid-Open No. 63-62754, it is considered that a flange formed in the pipe conduit and the through flange are fixed using a bolt, a nut, or the like. In such a case, it is assumed that it is difficult to secure a space for performing fastening work when attaching and detaching the through flange and the inspection rod, and the fastening work becomes complicated. Thus, there is a demand for an attachment device that can suitably attach and detach an information acquisition device and a method for attaching and detaching the information acquisition device.

SUMMARY OF THE INVENTION

Example embodiments of the present invention provide attachment devices each capable of suitably attaching and detaching an information acquisition device, and methods for attaching and detaching the information acquisition devices.

Example embodiments of the present invention will be described below.

An attachment device according to an example embodiment of the present disclosure is capable of attaching an information acquisition device to acquire information in a pipe conduit through which a fluid flows, the attachment device including a mount to be attached to the pipe conduit, the mount including a through hole communicating with an opening in the pipe conduit, a holder that is detachably attached to the mount by being inserted into the through hole and to which the information acquisition device is to be attached, and a jig to attach and detach the holder to and from the mount, in which the jig includes a first restriction portion to engage with the mount to restrict relative movement in a direction of axis of the opening with respect to the mount, and a second restriction portion to engage with the mount to restrict relative movement in a rotational direction around an axis line of the opening with respect to the mount, and the first restriction portion and the second restriction portion are engageable with the mount by relatively moving the jig in the rotational direction with respect to the mount.

According to an example embodiment of the present disclosure, attachment and detachment of the information acquisition device can be suitably performed.

The mount according to an example embodiment of the present disclosure includes a first projection projecting outward, the first restriction portion includes a first engagement portion that is open in the rotational direction and is engageable with the first projection as the first restriction portion moves in the rotational direction, and the second restriction portion includes a second engagement portion that is open downward and is engageable with the first projection as the second restriction portion moves downward in a case where positions of the second restriction portion and the first projection in the rotational direction coincide with each other.

According to an example embodiment of the present disclosure, by engaging the first engagement portion and the second engagement portion with the first projection, the movement of the jig in the upward-downward direction and the rotational direction with respect to the mount can be restricted.

The holder according to an example embodiment of the present disclosure includes a fixing portion to be detachably fixed to the mount by a predetermined operation, and the jig includes a fixed portion to which the fixing portion detached from the mount is to be detachably fixed.

According to an example embodiment of the present disclosure, the holder can be easily detached by fixing the holder to the jig.

The mount according to an example embodiment of the present disclosure includes a cutout extending in the direction of axis, and the holder includes a shaft to which the information acquisition device is to be attached and to accommodate a cable of the information acquisition device, a guide provided in the shaft and extending along the cutout, and a cable outlet through which the cable inside the shaft extends to an outside of the holder.

According to an example embodiment of the present disclosure, the information acquisition device can be positioned by guiding the guide to the cutout.

The holder according to an example embodiment of the present disclosure includes a shaft to which the information acquisition device is to be attached, and a protective portion in the through hole of the mount, the protective portion including an insertion hole through which the shaft and the information acquisition device are inserted, the protective portion being configured to protect the information acquisition device.

According to an example embodiment of the present disclosure, by providing the protective portion, the information acquisition device can be prevented from coming into contact with the mount or the like when the holder is attached or detached.

The jig according to an example embodiment of the present disclosure includes a third restriction portion to restrict relative movement in the direction of axis with respect to the protective portion in a state where the jig is engaged with the protective portion, and the third restriction portion can be engaged with the protective portion by relatively moving the jig in the rotational direction with respect to the protective portion in a state where engagement of the first restriction portion and the second restriction portion with respect to the mount is released.

According to an example embodiment of the present disclosure, the relative movement of the protective portion with respect to the jig in the direction of axis can be restricted only by relatively moving the jig with respect to the protective portion in the rotational direction, and in this state, the protective portion can be easily attached and detached using the jig.

The protective portion according to an example embodiment of the present disclosure includes a second projection projecting outward with respect to the mount, and the third restriction portion includes a third engagement portion that is open in the rotational direction and is engageable with the second projection as the third restriction portion moves in the rotational direction.

According to an example embodiment of the present disclosure, the relative movement of the protective portion with respect to the jig in the direction of axis can be restricted by engaging the third engagement portion with the second projection.

The second projection according to an example embodiment of the present disclosure includes a pressure outlet to release a pressure of the fluid in the pipe conduit.

According to an example embodiment of the present disclosure, the second projection can be used as a portion to release the pressure of the fluid.

A method for attaching and detaching an information acquisition device according to an example embodiment of the present disclosure is a method for attaching and detaching an information acquisition device, the method using the attachment device according to an example embodiment of the present disclosure, the method including engaging the first restriction portion and the second restriction portion with the mount by rotating the jig in the rotational direction with respect to the mount, and attaching and detaching the holder to and from the mount in a state where the first restriction portion and the second restriction portion are engaged with the mount.

According to an example embodiment of the present disclosure, attachment and detachment of the information acquisition device can be suitably performed.

According to example embodiments of the present disclosure, attachment and detachment of the information acquisition device can be suitably performed.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
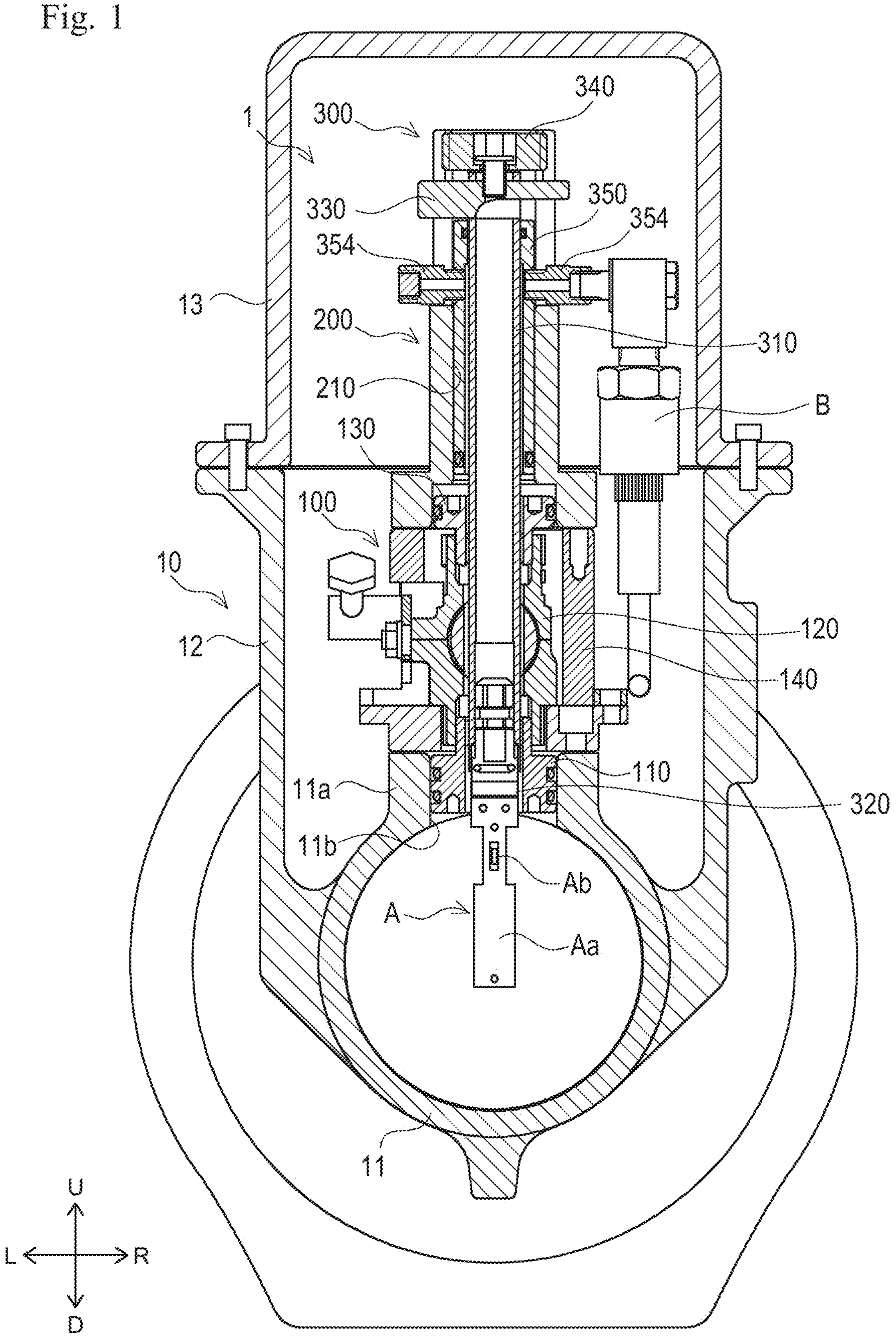
FIG. 1 is a front cross-sectional view showing an attachment device and a valve device according to a first example embodiment of the present disclosure.

In the following description, directions indicated by arrows U, D, F, B, L, and R in the drawings are defined as an upward direction, a downward direction, a forward direction, a rearward direction, a left direction, and a right direction, respectively. The drawings used in the following description are schematic views, and specific shapes, dimensions, and the like of each member are not limited to those illustrated.

An attachment device 1 according to the present example embodiment will be described below with reference to FIGS. 1 to 7.

The attachment device 1 is configured to attach an information acquisition device A that acquires information about a water pipe to a valve device 10. Hereinafter, the valve device 10 will be first described with reference to FIG. 1.

The valve device 10 shown in FIG. 1 is connected to a water pipe (buried pipe or the like) and is capable of partitioning a flow of tap water (fluid) flowing in the water pipe (for example, a gate valve). A valve body that partitions a flow of tap water is housed in the valve device 10. For convenience of description, FIG. 1 shows a cross section of a portion of the valve device 10 where the information acquisition device A is provided, and a portion where the valve body is provided is not shown. The valve device 10 is disposed inside a valve box (not shown) buried in the ground. The valve device 10 is a portion of a water pipe extending in the forward-rearward direction. The valve device 10 includes a pipe conduit 11, a sensor housing 12, and a sensor cover 13.

The pipe conduit 11 is a portion of a water pipe, and is a portion through which tap water (fluid) flows. The pipe conduit 11 is open in the forward-rearward direction, to which a water pipe is connected on the front side and the rear side. A protrusion 11*a* having a substantially cylindrical shape is above the pipe conduit 11 so as to project upward. An opening 11*b* that is open in the upward-downward direction is provided in the protrusion 11*a*.

The sensor housing 12 is a portion in which the attachment device 1 is housed. The sensor housing 12 has a substantially box shape that opens upward. The sensor housing 12 is provided in a portion of the valve device 10 where the protrusion 11*a* is provided.

The sensor cover 13 is a portion that covers the attachment device 1 provided in the sensor housing 12. The sensor cover 13 has a substantially box shape that opens downward. The sensor cover 13 is detachably attached to the sensor housing 12.

Next, the information acquisition device A will be described. The information acquisition device A illustrated in FIGS. 1 to 3 acquires information about a water pipe. The information acquisition device A includes a plate Aa that is elastically deformable and a strain gauge Ab provided on surfaces (front surface and rear surface) of the plate Aa. As shown in FIG. 1, the information acquisition device A is attached to the attachment device 1 such that the information acquisition device is located inside the pipe conduit 11 of the valve device 10.

The information acquisition device A detects, with the strain gauge Ab, deformation of the plate Aa caused by receiving a fluid force to acquire the flow velocity and the flowing direction of the water flowing in the water pipe. An appropriate cable Ac is connected to the strain gauge Ab (see FIG. 5). The acquisition result with the information acquisition device A can be transmitted to an external device (for example, an external server or the like) by an appropriate communication device connected to the cable Ac.

Next, the attachment device 1 will be described. The attachment device 1 shown in FIGS. 1 to 7 is fixed to the protrusion 11*a* of the valve device 10 and supports the information acquisition device A such that the information acquisition device A is positioned in the pipe conduit 11 of the valve device 10. The attachment device 1 includes a connection 100, a mount 200, a holder 300, a restriction jig 400, and a jig for attachment and detachment 500.

Figure 4:
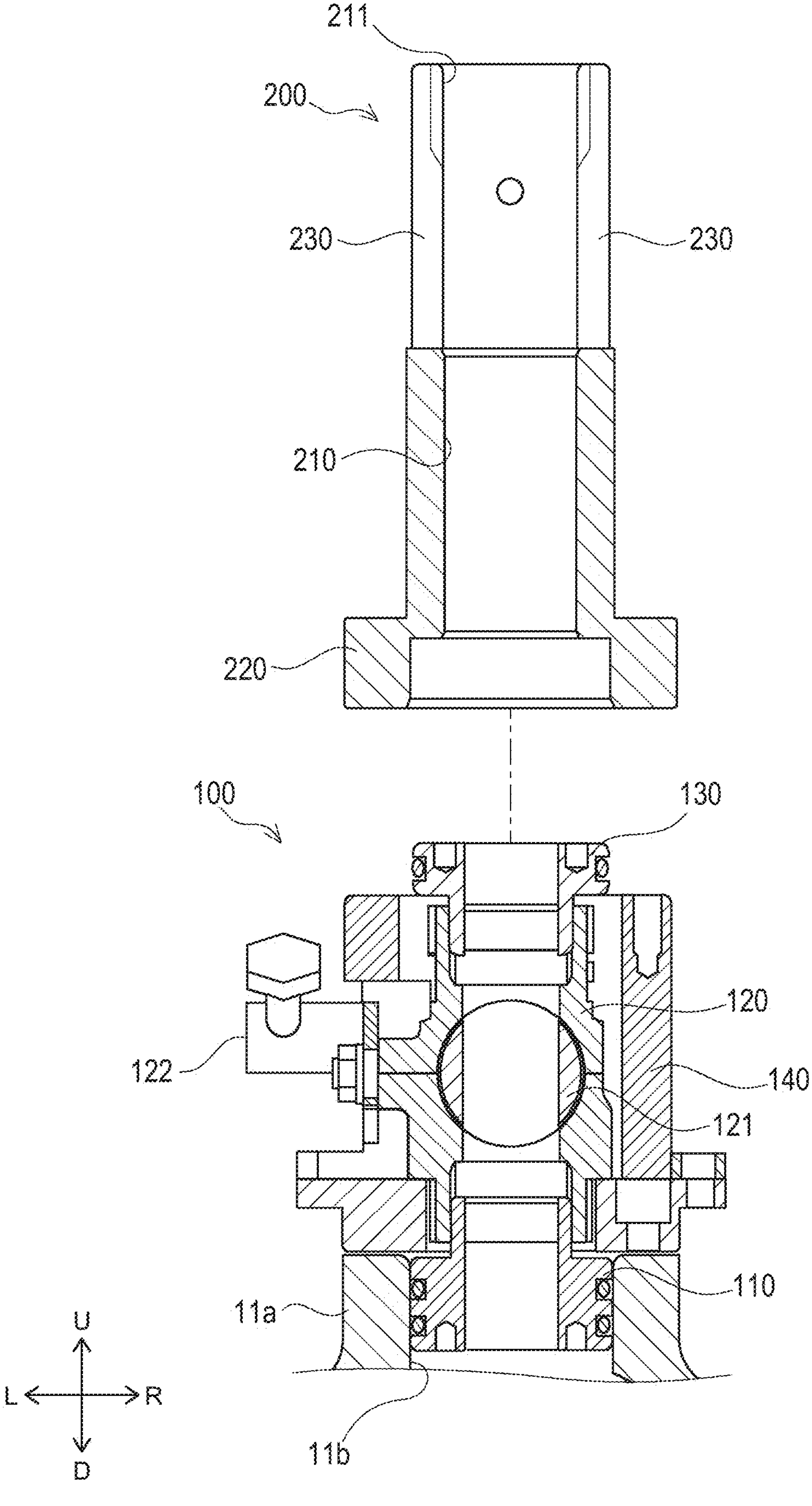
FIG. 4 is a front exploded cross-sectional view showing a connection and the mount.

The connection 100 shown in FIGS. 1 and 4 connects the protrusion 11*a* of the valve device 10 and the mount 200 described later. The connection 100 is configured to be able to stop tap water flowing through via the protrusion 11*a*. The connection 100 includes a lower valve connection 110, a valve 120, an upper valve connection 130, and an attachment 140.

The lower valve connection 110 is located in an opening 11*b* of the protrusion 11*a* and is connected to a lower portion of the valve 120 described later. The lower valve connection 110 has a substantially cylindrical shape with its direction of axis oriented in the upward-downward direction. As shown in FIG. 4, the lower valve connection 110 has the lower portion enlarged in diameter with respect to its upper portion. The lower portion (portion whose diameter is enlarged) of the lower valve connection 110 is inserted into the opening 11*b* of the protrusion 11*a*.

A male screw is provided by screw processing on the outer peripheral surface of the upper portion of the lower valve connection 110. A groove in which an O-ring is disposed is provided on the outer peripheral surface of the lower portion of the lower valve connection 110. The O-ring is made of a flexible material such as rubber. By providing the O-ring in the groove, a gap between the outer peripheral surface of the lower portion of the lower valve connection 110 and the inner peripheral surface of the opening 11*b* of the protrusion 11*a* can be sealed (filled).

The valve 120 can switch between stopping of water in the flow path branched by the protrusion 11*a* and releasing of the stopping of water. The valve 120 is provided with a valve body 121 inside a substantially cylindrical structure whose direction of axis is oriented in the upward-downward direction. In addition, the valve 120 includes an operation portion 122 that performs an operation of switching between stopping of water and releasing of the stopping of water with the valve body 121. A female screw is formed by screw processing at the upper and lower ends of the inner peripheral surface of the valve 120. The female screw at the lower portion of the valve 120 engages with the male screw at the upper portion of the lower valve connection 110. In the present example embodiment, a ball valve is used as the valve 120. The valve 120 is not limited to a ball valve, and various valves such as a butterfly valve can be used.

The upper valve connection 130 is connected to an upper portion of the valve 120. The upper valve connection 130 has a substantially cylindrical shape obtained by vertically inverting the lower valve connection 110. As shown in FIG. 4, the lower valve connection 110 has an upper portion that is enlarged in diameter with respect to its lower portion. A male screw is formed by screw processing on the outer peripheral surface of the lower portion of the lower valve connection 110. The male screw at the lower portion of the lower valve connection 110 engages with the female screw at the upper portion of the valve 120. A groove in which an O-ring is disposed is provided on the outer peripheral surface of the upper portion of the upper valve connection 130 in the substantially same manner as in the lower valve connection 110 described above.

The attachment 140 can be attached with the mount 200 described later. The attachment 140 has a substantially cylindrical shape with its direction of axis oriented in the upward-downward direction. The attachment 140 is fixed to the protrusion 11*a*. The attachment 140 covers a side surface of the valve 120.

The mount 200 shown in FIGS. 2, 3, 4, and 9 is attached to the connection 100, and the holder 300 described later is detachably attached. The mount 200 has a substantially cylindrical shape with its direction of axis oriented in the upward-downward direction. The mount 200 has a lower end that is enlarged in diameter with respect to other portions. The mount 200 includes a through hole 210, a fixing portion 220, a cutout 230, and a first projection 240.

The through hole 210 is a portion penetrating the mount 200 in the upward-downward direction. A lower end of the through hole 210 is enlarged in diameter according to the shape of the mount 200. As shown in FIGS. 1 and 4, the upper portion of the upper valve connection 130 is inserted into the lower end of the through hole 210. The gap between the inner peripheral surface of the mount 200 and the outer peripheral surface of the upper portion of the upper valve connection 130 is filled with the O-ring provided in the upper valve connection 130. A female screw 211 formed by screw processing is provided on the inner peripheral surface of an upper portion of the through hole 210.

The fixing portion 220 is a portion fixed to the attachment 140 of the connection 100. The fixing portion 220 is provided by a portion whose diameter is enlarged of the lower end of the mount 200. The mount 200 is fixed to the connection 100 by fixing the fixing portion 220 and an upper end of the attachment 140 with a fastening such as a bolt.

The cutout 230 is a portion cut out so as to extend in the upward-downward direction (direction of axis) on the side surface of the mount 200. The cutout 230 has a slit shape extending from an upper end of the mount 200 to a substantially central part in the upward-downward direction (see FIG. 13). A pair of cutouts 230 extend in a right-left direction (see FIG. 9).

Figure 3:
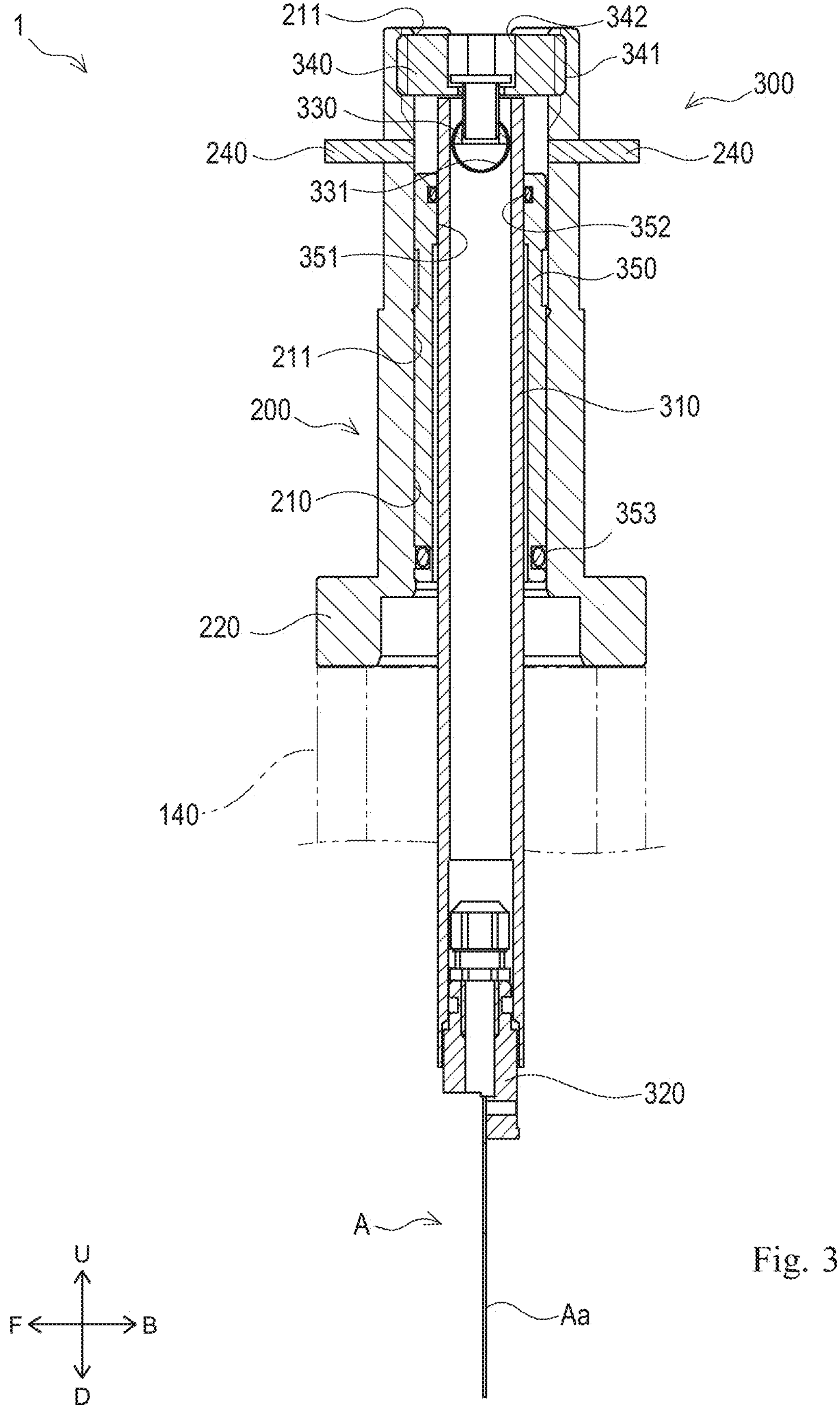
FIG. 3 is a side cross-sectional view showing the mount, the holder, and the information acquisition device.

The first projection 240 shown in FIG. 3 projects in the radial direction (the forward-rearward direction in FIG. 3) from the outer peripheral surface of the mount 200. The first projection 240 has a substantially cylindrical shape with its axis line oriented in the forward-rearward direction. A pair of first projections 240 is provided at an upper portion of the mount 200. The first projection 240 is at a position displaced by approximately 90 degrees with respect to the cutout 230 about the axis (center in plan view) of the mount 200 as a rotational center (see FIG. 9).

Figure 2:
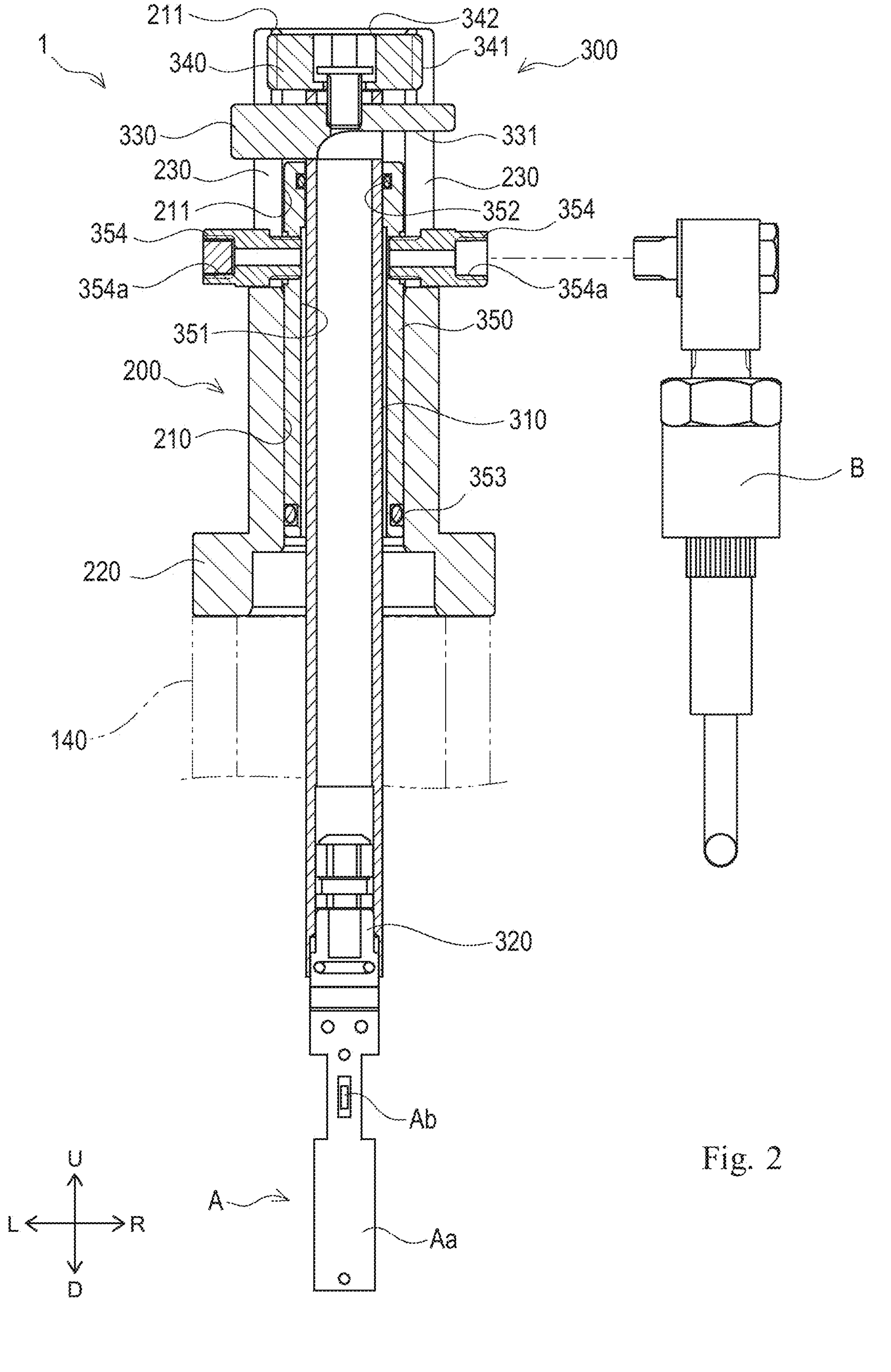
FIG. 2 is a front cross-sectional view showing a mount, a holder, and an information acquisition device.
Figure 5:
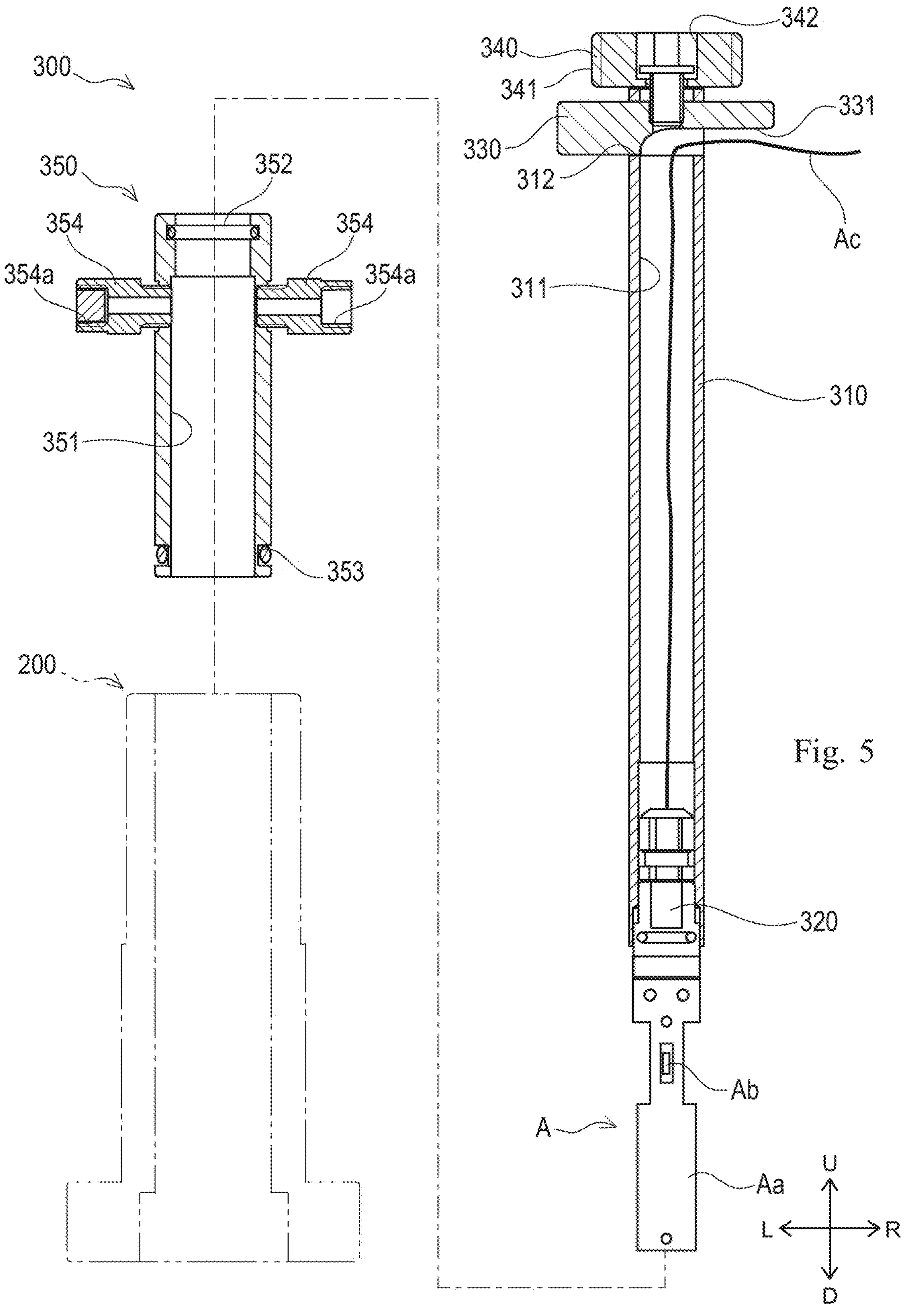
FIG. 5 is a front exploded cross-sectional view showing the holder.

The information acquisition device A is attached to the holder 300 shown in FIGS. 2, 3, and 5. The holder 300 is elongated in the upward-downward direction, and is detachably attached to the mount 200 by being inserted into the through hole 210. The holder 300 includes a shaft 310, an attachment 320, a guide 330, a fixing portion 340, and a protective portion 350.

The shaft 310 is a substantially cylindrical portion elongated in the upward-downward direction. As shown in FIG. 5, a through hole 311 penetrates the shaft 310 in the direction of axis (upward-downward direction). The shaft 310 includes a guide insertion hole 312 that penetrates an upper portion of the shaft 310 in the radial direction (right-left direction) and communicates with the through hole 311.

The attachment 320 is a portion to which the information acquisition device A is attached. The attachment 320 has a substantially cylindrical shape with its axis line oriented in the upward-downward direction. As shown in FIG. 3, a lower end of the attachment 320 has a front side surface with a planar shape to which the information acquisition device A can be attached. The attachment 320 is fixed in a state of being inserted into the through hole 311 at a lower end of the shaft 310.

The guide 330 shown in FIGS. 2 and 5 is a portion guided along the cutout 230 of the mount 200. The guide 330 has a substantially cylindrical shape with its axis line oriented in the right-left direction. The guide 330 is fixed to the shaft 310 by being inserted into the guide insertion hole 312 of the shaft 310. The guide 330 is provided so as to project right and left from the shaft 310.

The outer diameter of the guide 330 has a dimension (for example, slightly small) corresponding to the width dimensions (forward-rearward dimensions) of the cutout 230. As illustrated in FIG. 2, in a state where the holder 300 is attached to the mount 200, the guide 330 is positioned in the cutout 230. As a result, the rotation of the holder 300 with respect to the mount 200 is restricted. The guide 330 includes a cable outlet 331.

The cable outlet 331 shown in FIG. 5 is to allow the cable Ac of the information acquisition device A to extend outside of the holder 300. The cable outlet 331 is formed by cutting out the lower half of the right side portion of the guide 330. Since the cable outlet 331 is provided, a substantially semicircular opening communicating with the through hole 311 of the shaft 310 is provided at the right end of the guide 330 (see FIG. 3).

In the present example embodiment, an example in which the guide 330 is formed separately from the shaft 310 has been described, but the present invention is not limited to such an example. For example, the guide 330 may be integrally formed with the shaft 310.

The fixing portion 340 shown in FIGS. 2, 3, and 5 is a portion detachably fixed to the mount 200. The fixing portion 340 has a substantially cylindrical shape with its axis line oriented in the upward-downward direction. The fixing portion 340 is linked to an upper end of the shaft 310 so as to be rotatable about the axis line oriented in the upward-downward direction.

A male screw 341 is formed by screw processing on the outer peripheral surface of the fixing portion 340. The male screw 341 of the fixing portion 340 engages with the female screw 211 of the through hole 210 of the mount 200.

An operation hole 342 to rotate the fixing portion 340 is provided in the upper surface of the fixing portion 340. The operation hole 342 is engageable with the jig for attachment and detachment 500 described later. By performing a rotation operation of the fixing portion 340, the holder 300 can be attached to and detached from the mount 200.

The protective portion 350 shown in FIGS. 2, 3, and 5 can protect the information acquisition device A. The protective portion 350 has a substantially cylindrical shape with its direction of axis oriented in the upward-downward direction. The protective portion 350 is located in the through hole 210 of the mount 200, and the shaft 310 of the holder 300 is inserted therethrough. The outer diameter of the protective portion 350 is slightly smaller than the inner diameter of the through hole 210 of the mount 200. The protective portion 350 includes an insertion hole 351, a first groove 352, a second groove 353, and a second projection 354.

The insertion hole 351 is a hole penetrating the protective portion 350 in the upward-downward direction. The shaft 310 is inserted into the insertion hole 351. The inner diameter of the insertion hole 351 is s slightly larger than the outer diameter of the shaft 310.

The first groove 352 extends in a circumferential direction on the inner peripheral surface of the upper portion of the insertion hole 351. In the first groove 352, an O-ring made of a flexible material such as rubber, for example, is provided. By providing the O-ring in the first groove 352, a gap between the outer peripheral surface of the shaft 310 and the inner peripheral surface of the insertion hole 351 can be sealed.

The second groove 353 is a groove extending in the circumferential direction on the outer peripheral surface of the lower portion of the protective portion 350. An O-ring is provided in the second groove 353 similarly to the first groove 352. By providing the O-ring in the second groove 353, a gap between the outer peripheral surface of the protective portion 350 and the inner peripheral surface of the through hole 210 can be sealed.

The second projection 354 projects outward (in the right-left direction) from the side surface of the protective portion 350. The second projection 354 has a substantially cylindrical shape with its axis line oriented in the right-left direction. A pair of second projections 354 is provided on the right and left at an upper portion of the protective portion 350. The second projection 354 is inserted into a hole that penetrates the side surface of the protective portion 350 in the right-left direction. The outer diameter of the second projection 354 has a dimension (for example, slightly small) corresponding to the width dimensions (forward-rearward dimensions) of the cutout 230 of the mount 200. The second projection 354 includes a pressure outlet **354*a***.

The pressure outlet **354*a* is a portion to which a pressure sensor B (see FIG. 2) capable of acquiring (measuring) the pressure in the water pipe is attached. The pressure outlet 354*a* penetrates the second projection 354 in the direction of axis (right-left direction). The pressure outlet 354*a* communicates with the insertion hole 351 of the protective portion 350**.

A female screw engageable with the pressure sensor B is provided on the inner surface of the pressure outlet 354*a*. In the present example embodiment, as shown in FIGS. 1 and 2, an example is shown in which the pressure sensor B is attached to the second projection 354 on the right of the right and left second projections 354. The second projection 354 on the left is provided with a plug that closes the pressure outlet 354*a*. The pressure sensor B is not shown in the drawings other than FIGS. 1 and 2.

In the present example embodiment, an example in which the second projection 354 is formed separately from the body (a portion with a cylindrical shape) of the protective portion 350 has been described, but the present invention is not limited to such an example. For example, the second projection 354 may be integrally formed with the body of the protective portion 350.

FIGS. 1 to 3 show a state in which the holder 300 as described above is attached to the mount 200. In this state, the holder 300 is inserted through the mount 200 and the connection 100 such that the information acquisition device A is located inside the pipe conduit 11 of the valve device 10 (see FIG. 1). Information regarding the water pipe can be thus acquired. In this case, stopping of water with the valve 120 of the connection 100 is released, and the connection 100 and the mount 200 communicate with the protrusion 11*a* of the pipe conduit 11. Thus, a water pressure of water flowing through the water pipe is applied to the holder 300 inside the mount 200 (through hole 210).

Here, as shown in FIG. 2, a gap is provided in the radial direction at a portion below the O-ring in the first groove 352 between the outer peripheral surface of the shaft 310 of the holder 300 and the inner peripheral surface of the insertion hole 351 of the protective portion 350. The gap communicates with the pressure outlet 354*a* of the second projection 354. In the present example embodiment, the pressure in the water pipe can be acquired through the gap using the pressure sensor B provided in the pressure outlet 354*a*.

As illustrated in FIG. 2, in a state where the holder 300 is attached to the mount 200, the guide 330 and the second projection 354 are positioned in the cutout 230 of the mount 200. Thus, the holder 300 is positioned with respect to the mount 200. Thus, the information acquisition device A can be positioned via the holder 300. According to the above configuration, like the information acquisition device A, a device in which the direction (orientation) with respect to the flowing direction of the fluid affects the measurement accuracy can be accurately positioned. In this state, the second projection 354 projects outward with respect to the mount 200.

Figure 8A:
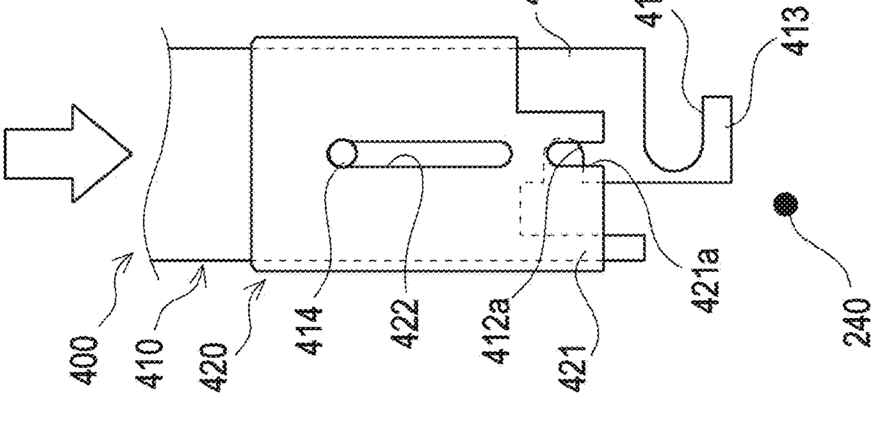
FIG. 8A is a schematic view showing a state in which the restriction jig is lowering.
Figure 8B:
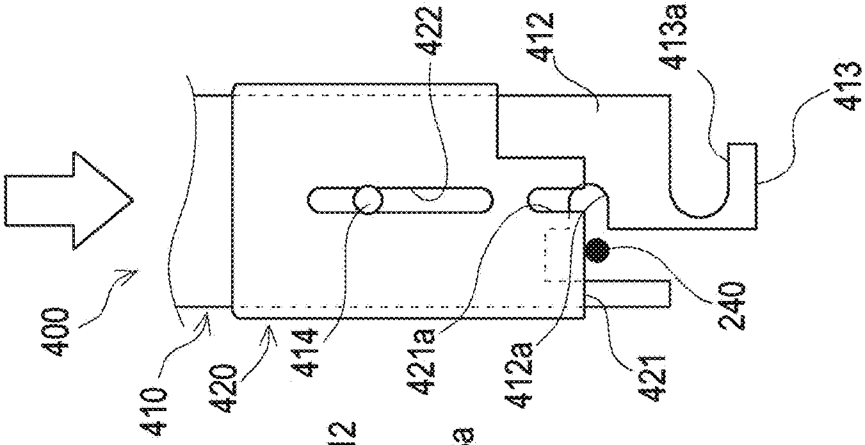
FIG. 8B is a schematic view showing a state in which an outer portion abuts on a first projection.
Figure 8C:
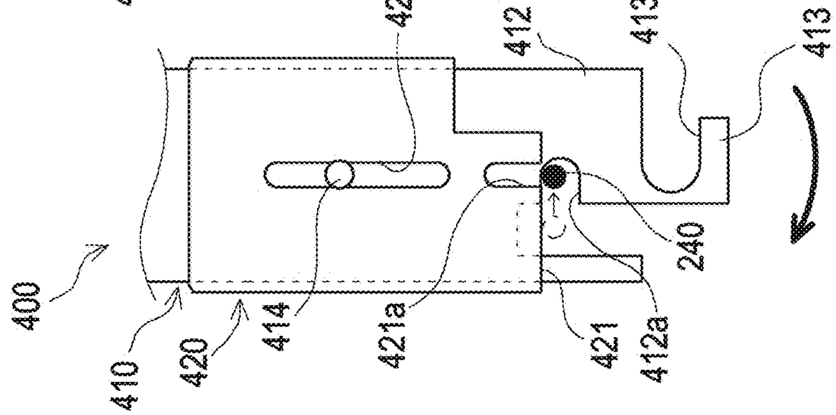
FIG. 8C is a schematic view showing a state in which the restriction jig is rotating.
Figure 8D:
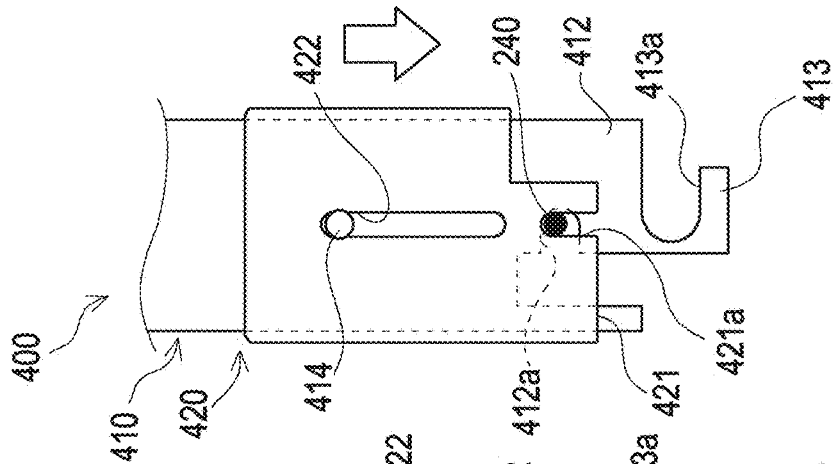
FIG. 8D is a schematic view showing a state in which the restriction jig is engaged with the first projection.
Figure 9:
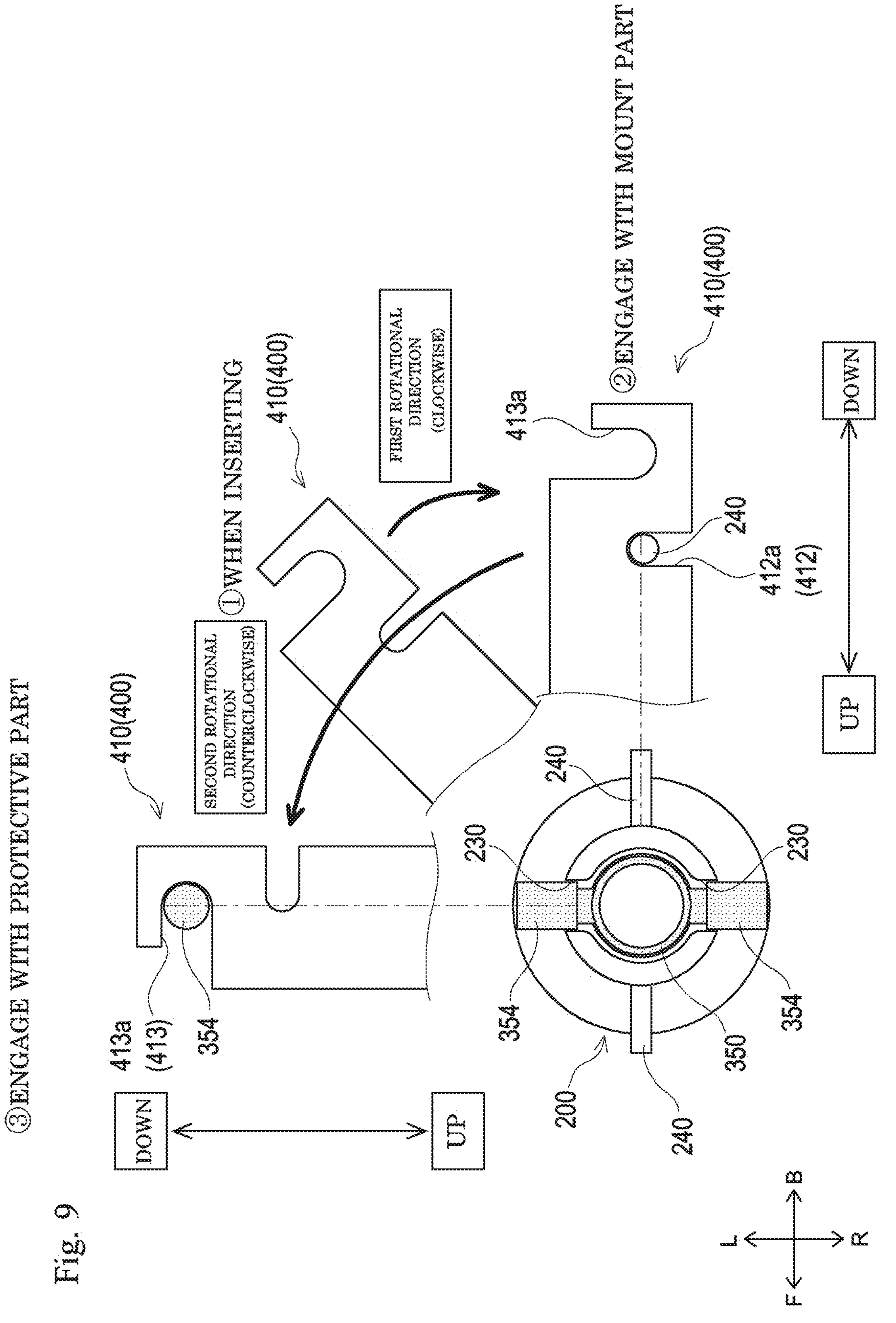
FIG. 9 is a schematic view showing a positional relationship between the restriction jig, the first projection, and a second projection.

The restriction jig 400 shown in FIGS. 6A to FIG. 9 is to attach and detach the holder 300 to and from the mount 200. The restriction jig 400 has a substantially cylindrical shape into which the mount 200 can be inserted. The restriction jig 400 engages with the mount 200 by rotating about a center (axis line in upward-downward direction) in plan view as a rotational center in a state where the mount 200 is inserted. Hereinafter, as shown in FIG. 9, the clockwise rotational direction in plan view will be referred to as rotational "first direction", and the counterclockwise rotational direction in plan view will be referred to as "second rotational direction". Details of the engagement mode of the restriction jig 400 with respect to the mount 200 will be described later. The restriction jig 400 is elongated in the upward-downward direction. The restriction jig 400 includes an inner portion 410 and an outer portion 420.

Figure 6A:
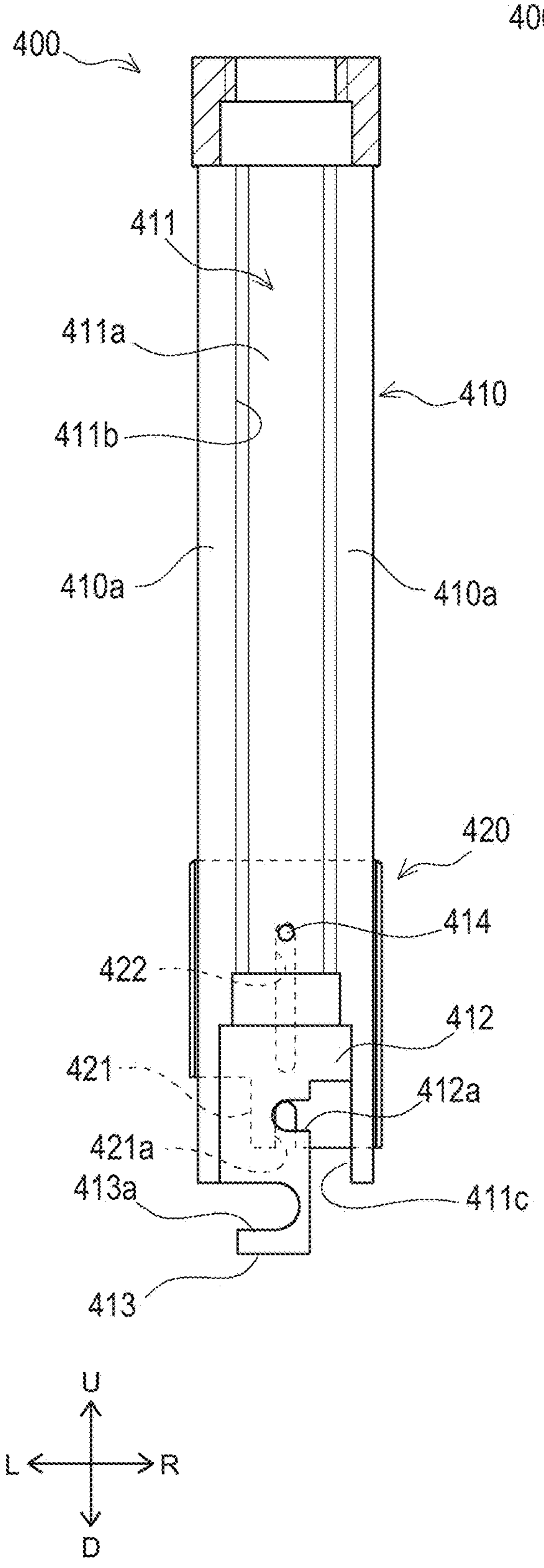
FIG. 6A is a front cross-sectional view showing a restriction jig.
Figure 6B:
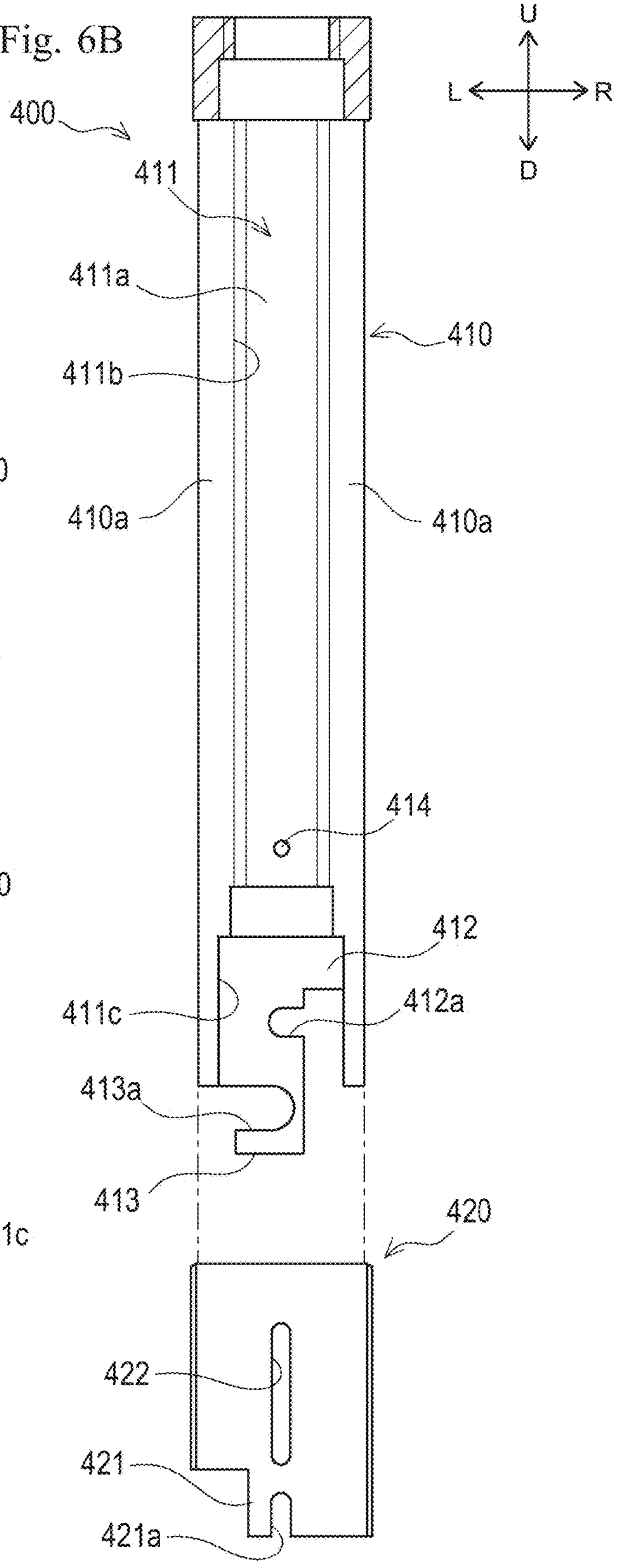
FIG. 6B is a front exploded cross-sectional view showing the restriction jig.

The inner portion 410 shown in FIGS. 6A and 6B and FIGS. 7A and 7B are substantially cylindrical portions whose axis line is oriented in the upward-downward direction. The inner portion 410 includes a slit 410*a* cut out so as to extend in the upward-downward direction from the lower end to the upper portion. As shown in FIGS. 6A and 6B, a pair of slits 410*a* is provided in the radial direction (right-left direction). The inner portion 410 has a substantially point symmetrical shape with the axis (center in plan view) as a rotational center. The inner portion 410 includes an insertion hole 411, a first mount restriction portion 412, a protective portion restriction portion 413, and a guide pin 414.

The insertion hole 411 is a portion through which the mount 200, the holder 300, and the like are inserted. The insertion hole 411 penetrates the inner portion 410 in the upward-downward direction. The insertion hole 411 includes a first insertion hole 411*a* and a second insertion hole 411*c*.

The first insertion hole 411*a* is a portion of an upper portion of the insertion hole 411. The inner diameter of the first insertion hole 411*a* is substantially equal to the inner diameter of the through hole 210 of the mount 200. A female screw 411*b* is formed by screw processing on the inner peripheral surface of the first insertion hole 411*a*. The female screw 411*b* of the first insertion hole 411*a* engages with the male screw 341 in the fixing portion 340 of the holder 300 (see FIG. 11).

The second insertion hole 411*c* is a portion of a lower portion of the insertion hole 411. The dimension in the upward-downward direction of the second insertion hole 411*c* is smaller than the dimension in the upward-downward direction of the first insertion hole 411*a*. The second insertion hole 411*c* is enlarged in diameter with respect to the first insertion hole 411*a*. The inner diameter of the second insertion hole 411*c* is slightly larger than the outer diameter of the mount 200 so that the mount 200 can be inserted (see FIG. 10 and the like).

The first mount restriction portion 412 is a portion that engages with the mount 200 to restrict the relative movement in the upward-downward direction with respect to the mount 200. The first mount restriction portion 412 is located at a lower portion of the inner portion 410. The first mount restriction portion 412 engages with the first projection 240 of the mount 200. A pair of first mount restriction portions 412 is provided so as to correspond to the pair of first projections 240. The first mount restriction portion 412 includes a first engagement portion 412*a*.

The first engagement portion 412*a* shown in FIGS. 6A and 6B is a portion that engages with the first projection 240. The first engagement portion 412*a* has a shape (a substantially groove shape) that is open in the first rotational direction (right direction in FIGS. 6A and 6B) and extends in a rotational direction (circumferential direction). The width dimension (dimension in upward-downward direction) of the first engagement portion 412*a* is slightly larger than the outer diameter of the first projection 240. In a state where the first engagement portion 412*a* is engaged with the first projection 240, relative movement of the inner portion 410 (first mount restriction portion 412) and the mount 200 in the upward-downward direction is restricted (see FIG. 9 and the like).

The protective portion restriction portion 413 shown in FIGS. 6A and 6B is a portion that engages with the protective portion 350 to restrict the relative movement in the upward-downward direction with respect to the protective portion 350. The protective portion restriction portion 413 is located at a lower end of the inner portion 410. The protective portion restriction portion 413 engages with the second projection 354 of the protective portion 350. A pair of protective portion restriction portions 413 is provided so as to correspond to the pair of second projections 354. The protective portion restriction portion 413 includes a protective portion engagement portion 413*a*.

The protective portion engagement portion 413*a* is a portion that engages with the second projection 354. The protective portion engagement portion 413*a* has a shape (a substantially groove shape) that is open in the second rotational direction (left direction in FIGS. 6A and 6B) and extends in a rotational direction (circumferential direction). The width dimension (dimension in upward-downward direction) of the protective portion engagement portion 413*a* is slightly larger than the outer diameter of the second projection 354. In a state where the protective portion engagement portion 413*a* is engaged with the second projection 354, relative movement of the inner portion 410 (first mount restriction portion 412) and the protective portion 350 in the upward-downward direction is restricted (see FIG. 9 and the like).

The guide pin 414 guides the movement in the upward-downward direction of the outer portion 420 described later. The guide pin 414 is provided so as to project in the radial direction (the forward-rearward direction in FIGS. 7A and 7B) from the outer peripheral surface of the inner portion 410. The guide pin 414 has a substantially cylindrical shape with its axis line oriented in the forward-rearward direction. A pair of guide pins 414 is provided on the front side and the rear side.

The outer portion 420 shown in FIGS. 6 and 7 is a portion provided on the radially outer side of the inner portion 410. The outer portion 420 is provided so as to cover the outer peripheral surface of the inner portion 410 at the lower portion of the inner portion 410. The outer portion 420 has a plate shape having a curved surface corresponding to the outer peripheral surface of the inner portion 410. As shown in FIGS. 6A and 6B, a pair of outer portions 420 is provided on the front side and the rear side.

The pair of outer portions 420 has a substantially point symmetrical shape with the axis (center in plan view) of the restriction jig 400 as a rotational center. The outer portion 420 is relatively movable in the upward-downward direction with respect to the inner portion 410. The outer portion 420 includes a second mount restriction portion 421 and a guide groove 422.

The second mount restriction portion 421 is a portion that engages with the mount 200 to restrict the relative movement in the rotational direction with respect to the mount 200. The second mount restriction portion 421 is located at a lower end of the outer portion 420. The second mount restriction portion 421 engages with the first projection 240 of the mount 200. The second mount restriction portion 421 is provided to each of the pair of outer portions 420 so as to correspond to the pair of first projections 240. The second mount restriction portion 421 includes a second engagement portion 421*a*.

The second engagement portion 421*a* shown in FIGS. 6A and 6B are portions that engage with the first projection 240. The second engagement portion 421*a* has a shape (a substantially groove shape) that is open downward and extends in the upward-downward direction. The width dimension (dimension in rotational direction) of the second engagement portion 421*a* is slightly larger than the outer diameter of the first projection 240. As shown in FIG. 6A, the second engagement portion 421*a* is configured such that the position in the circumferential direction coincides with the position in the circumferential direction of the first engagement portion 412*a*. In a state where the second engagement portion 421*a* is engaged with the first projection 240, relative movement of the outer portion 420 (second mount restriction portion 421) and the mount 200 in the rotational direction is restricted (see FIG. 8D and the like).

Figure 7A:
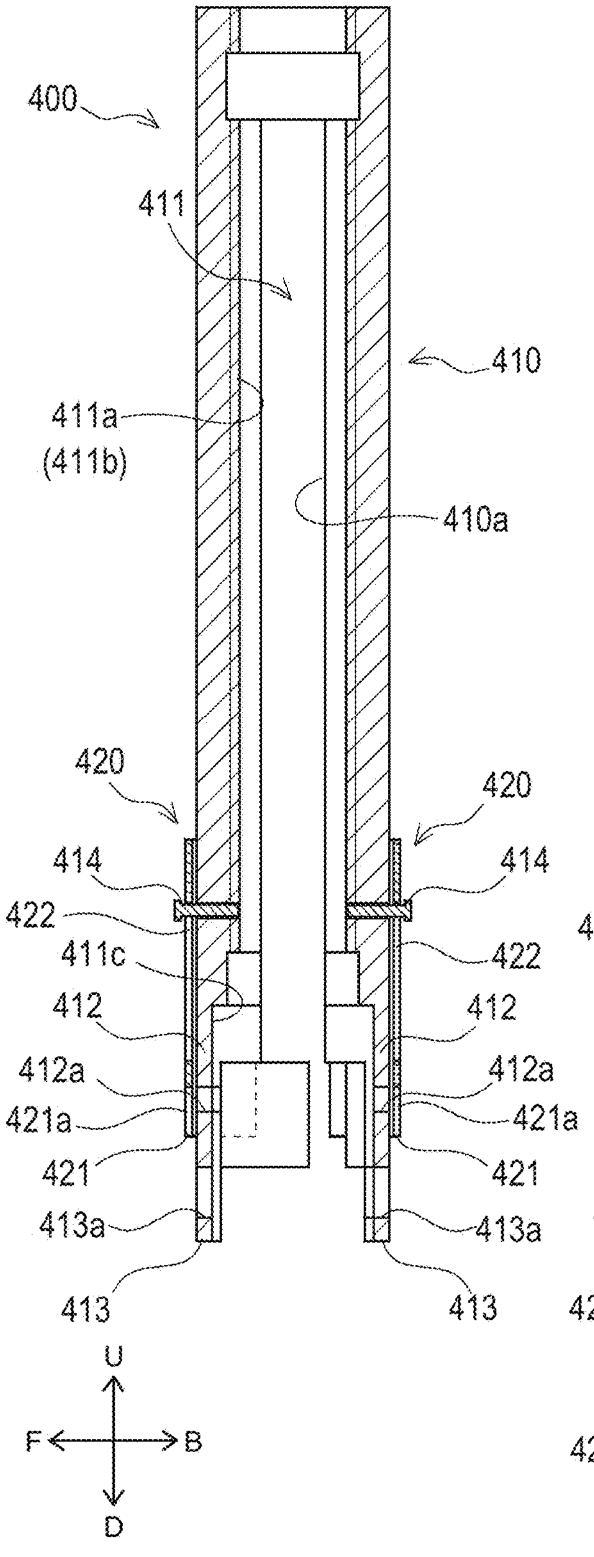
FIG. 7A is a side cross-sectional view showing the restriction jig.
Figure 7B:
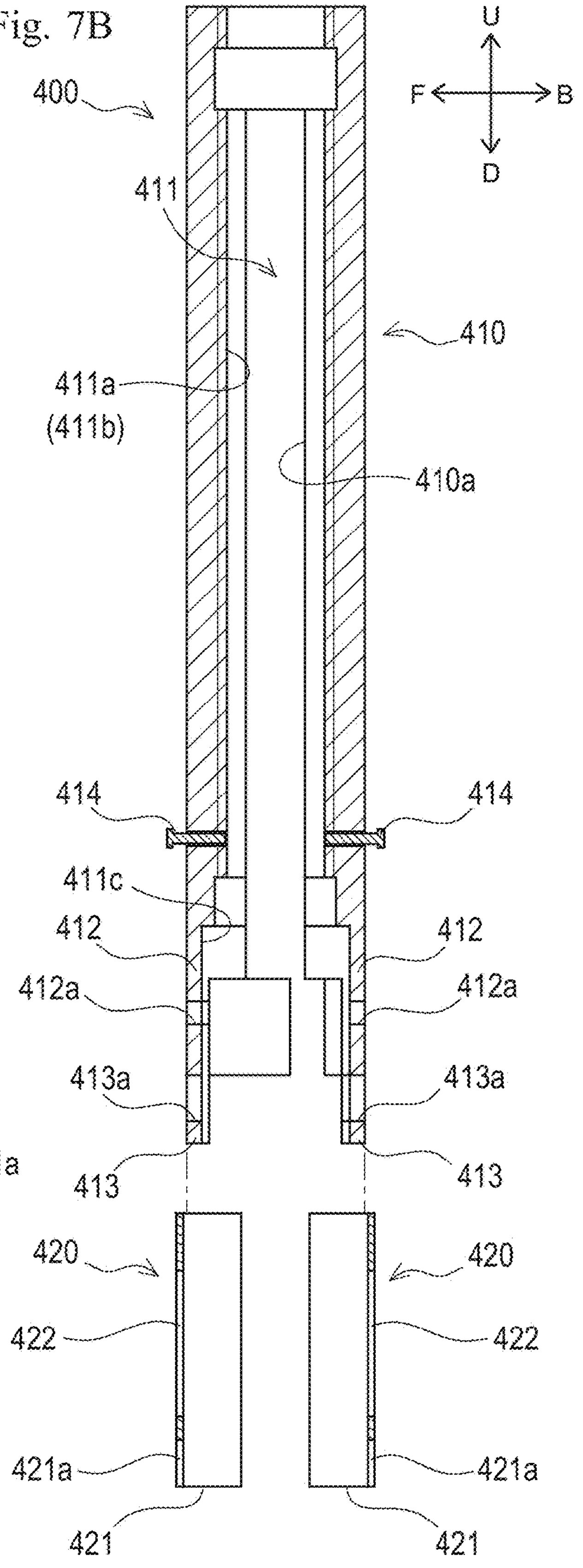
FIG. 7B is a front exploded cross-sectional view showing the restriction jig.

The guide groove 422 shown in FIGS. 6A and 6B and FIGS. 7A and 7B guides the movement of the outer portion 420 in the upward-downward direction with respect to the inner portion 410. The guide groove 422 penetrates the outer portion 420 and has a shape (a substantially groove shape) extending in the upward-downward direction. As shown in FIGS. 6A and 7A, the guide pin 414 is inserted into the guide groove 422. The movement of the outer portion 420 in the upward-downward direction with respect to the inner portion 410 is guided by the relative movement of the guide pin 414 in the guide groove 422. The guide pin 414 can prevent the outer portion 420 from falling off from the inner portion 410.

Figure 10:
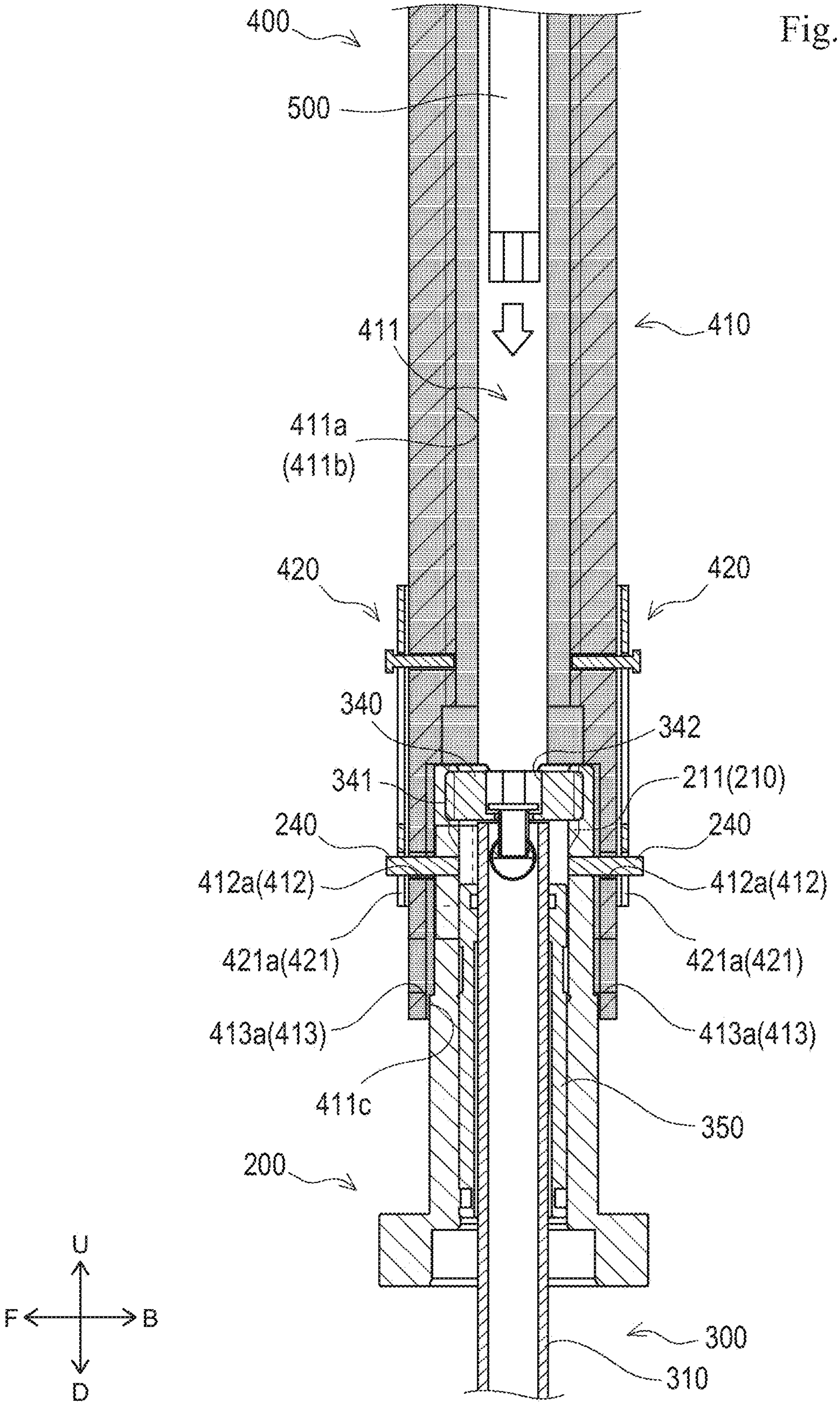
FIG. 10 is a side cross-sectional view showing a state in which the restriction jig is engaged with the first projection of the mount.
Figure 11:
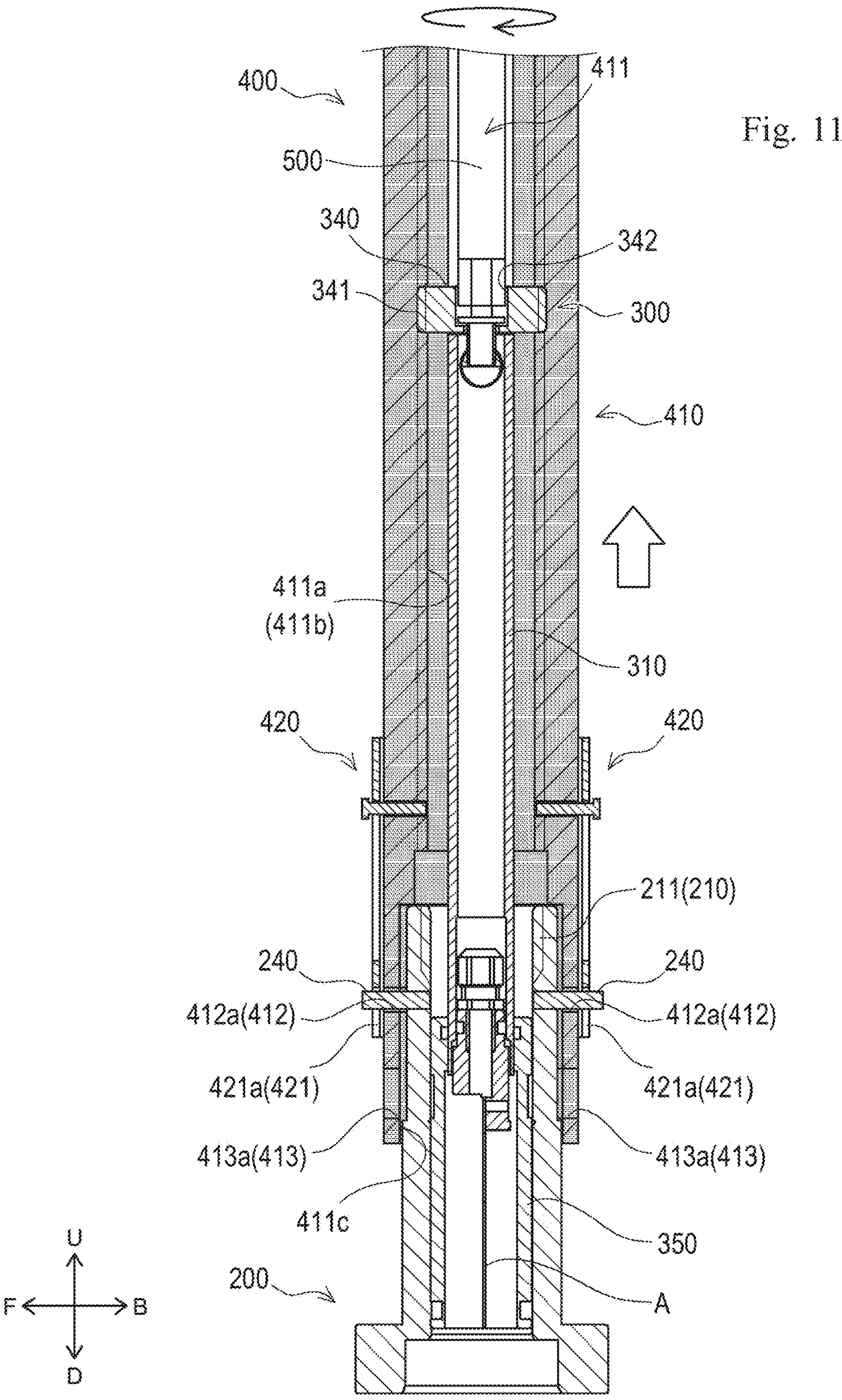
FIG. 11 is a side cross-sectional view showing a state in which the holder is being detached from the mount with a jig for attachment and detachment.

The jig for attachment and detachment 500 shown in FIGS. 10 and 11 attaches and detaches the holder 300 to and from the mount 200 in a state where the restriction jig 400 is engaged with the mount 200. The jig for attachment and detachment 500 has a substantially cylindrical shape elongated in the upward-downward direction with its axis line oriented in the upward-downward direction. The jig for attachment and detachment 500 is insertable into the insertion hole 411 of the restriction jig 400 (inner portion 410). The tip of the jig for attachment and detachment 500 has a shape that is engageable with the operation hole 342 formed in the fixing portion 340 of the holder 300. The fixing portion 340 can be rotated by rotating the jig for attachment and detachment 500 about the axis line in a state where the tip of the jig for attachment and detachment 500 is engaged with the operation hole 342 of the fixing portion 340.

The configuration of the attachment device 1 has been described above. Hereinafter, a method for attaching and detaching the information acquisition device A using the attachment device 1 as described above will be described with reference to FIGS. 8A to 8D to FIG. 13. In the following drawings, the protective portion 350 in FIG. 9 and the inner portion 410 in FIGS. 10 and 11 are colored to easily distinguish the structures from each other.

First, a method for detaching the information acquisition device A will be described. Hereinafter, as shown in FIG. 1, an example in which the holder 300 is attached to the mount 200, and the information acquisition device A disposed inside the pipe conduit 11 of the valve device 10 is detached, will be described.

When detaching the information acquisition device A, an operator pulls up the holder 300 with respect to the mount 200 using the restriction jig 400 and the jig for attachment and detachment 500 from the outside (upper side) of the valve box to detach the information acquisition device A. At this time, the operator first detaches the sensor cover 13 from the sensor housing 12.

Next, as shown in FIG. 8A, the operator lowers the restriction jig 400, and inserts the mount 200 into the second insertion hole 411*c* of the restriction jig 400 (inner portion 410) (see FIG. 10). At this time, the orientation of the rotational direction of the restriction jig 400 is adjusted such that the restriction jig 400 does not interfere with the second projection 354 of the protective portion 350. In the present example embodiment, the orientation of the rotational direction of the restriction jig 400 is adjusted such that the second projection 354 is positioned in the slit 410*a* of the inner portion 410.

As shown in FIG. 8B, as the restriction jig 400 lowers, the lower end of the outer portion 420 abuts the first projection 240 of the mount 200. When the restriction jig 400 is further lowered in this state, the outer portion 420 relatively moves upward with respect to the inner portion 410.

In the present example embodiment, the restriction jig 400 is lowered until the upper end of the mount 200 abuts a step between the first insertion hole 411*a* and the second insertion hole 411*c* of the inner portion 410 (see FIG. 10). In the present example embodiment, as shown in FIG. 8C, in a state where the upper end of the mount 200 abuts the step, the positions of the first engagement portion 412*a* and the first projection 240 in the upward-downward direction substantially coincide with each other. In this state, the positions of the protective portion engagement portion 413*a* and the second projection 354 in the upward-downward direction substantially coincide with each other.

Next, as shown in FIGS. 8C and 9, the operator rotates the restriction jig 400 in the first rotational direction (clockwise). As a result, the first projection 240 is positioned in the first engagement portion 412*a* and relatively moves in the rotational direction in the first engagement portion 412*a*. In this state, the first projection 240 is engaged by the first engagement portion 412*a*, and the relative movement in the upward-downward direction between the restriction jig 400 (inner portion 410) and the mount 200 is restricted.

As shown in FIG. 8D, in a case where the position of the second engagement portion 421*a* of the outer portion 420 in the rotational direction coincides with the first projection 240 as the restriction jig 400 rotates, the restriction of the downward movement of the outer portion 420 with the first projection 240 is released, and the outer portion 420 moves downward because of gravity. As a result, the first projection 240 relatively moves in the upward-downward direction in the second engagement portion 421*a*. In this state, the first projection 240 is engaged by the second engagement portion 421*a*, and the relative movement in the rotational direction between the restriction jig 400 (outer portion 420) and the mount 200 is restricted.

FIG. 10 shows a state in which the restriction jig 400 is engaged with the mount 200 as described above. In this state, as described above, the relative movement of the restriction jig 400 with respect to the mount 200 in the upward-downward direction and the rotational direction is restricted.

Next, as shown in FIG. 10, the operator inserts the jig for attachment and detachment 500 into the restriction jig 400. The tip of the jig for attachment and detachment 500 is caused to engage with the operation hole 342 in the fixing portion 340 of the holder 300 (see FIG. 11).

Next, the operator operates the jig for attachment and detachment 500 to rotate the fixing portion 340 in the direction of detaching the holder 300 from the mount 200. When the fixing portion 340 screwed into the female screw 211 of the mount 200 is rotated in the direction to be detached, the portion of the holder 300 excluding the protective portion 350 (shaft 310, attachment 320, guide 330, and fixing portion 340) and the information acquisition device A lift with respect to the mount 200.

In this state, the guide 330 is guided along the cutout 230 of the mount 200, and thus, the upward movement of the holder 300 is guided. In the present example embodiment, since the guide 330 is provided, the cable Ac taken out from the cable outlet 331 is prevented from being caught with the lifting. In addition, the fixing portion 340 is detached from the mount 200 with the lifting.

After the fixing portion 340 is detached from the mount 200, the portion of the holder 300 excluding the protective portion 350 and the information acquisition device A move (lift) to the restriction jig 400 side. The above-described movement can be performed by pushing up using water pressure in the water pipe or pulling up with the jig for attachment and detachment 500.

As shown in FIG. 11, when the operator further rotates the fixing portion 340 in a state where the fixing portion 340 is detached from the mount 200, the fixing portion 340 is screwed into the female screw 411*b* of the inner portion 410. When the fixing portion 340 is further rotated, the holder 300 and the information acquisition device A lift with respect to the inner portion 410.

Here, in a state where the fixing portion 340 is detached from the mount 200, the restriction jig 400 receives the water pressure in the water pipe through the holder 300. In the present example embodiment, since the movement of the restriction jig 400 in the upward-downward direction with respect to the mount 200 is restricted, the restriction jig 400 can be prevented from lifting with the water pressure even when the water pressure is applied to the holder 300.

In the present example embodiment, since the movement of the restriction jig 400 with respect to the mount 200 in the rotational direction is restricted, the restriction jig 400 can be prevented from rotating (co-rotating) along with the rotation of the fixing portion 340 using the jig for attachment and detachment 500.

As shown in FIG. 11, the operator lifts the information acquisition device A by operating the jig for attachment and detachment 500 until the information acquisition device A is positioned inside the protective portion 350 (above the valve 120). In this state, the operator operates the valve 120 of the connection 100 to stop water. In this state, no water pressure is applied to the holder 300.

Next, the operator performs the operation shown in FIGS. 8A to 8D in reverse to release the restriction of the restriction jig 400 with respect to the mount 200. That is, the outer portion 420 is moved upward, and the restriction jig 400 (the inner portion 410) is rotated in the second rotational direction (counterclockwise).

Figure 12:
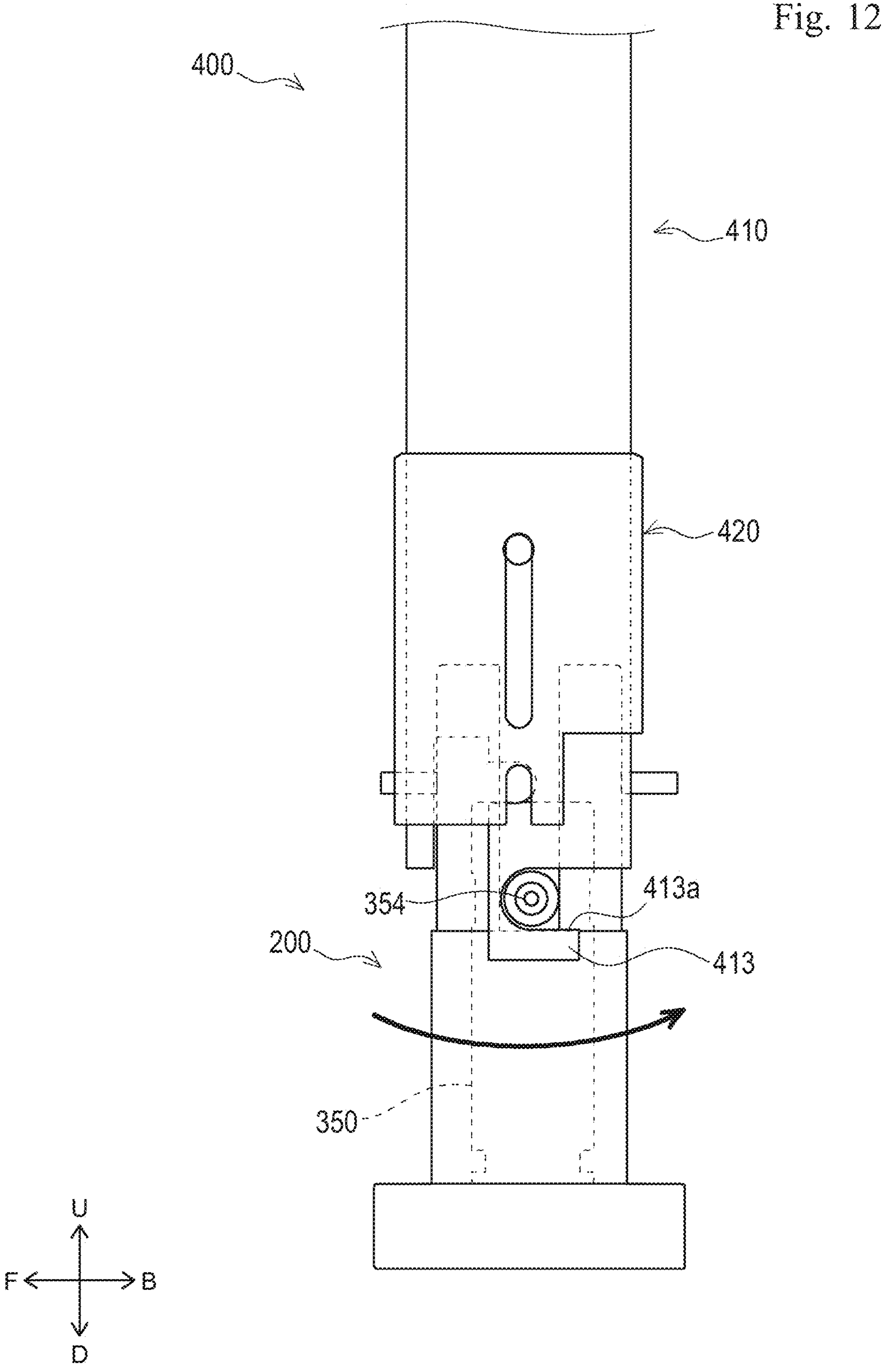
FIG. 12 is a side view showing a state in which the restriction jig is engaged with the second projection of the protective portion.

In addition, as shown in FIGS. 9 and 12, the operator further rotates the restriction jig 400 in the second rotational direction (counterclockwise). As a result, the second projection 354 is positioned in the protective portion engagement portion 413*a* and relatively moves in the rotational direction in the protective portion engagement portion 413*a*. In this state, the second projection 354 is engaged by the protective portion engagement portion 413*a*, and the relative movement in the upward-downward direction between the restriction jig 400 (inner portion 410) and the protective portion 350 is restricted.

Figure 13:
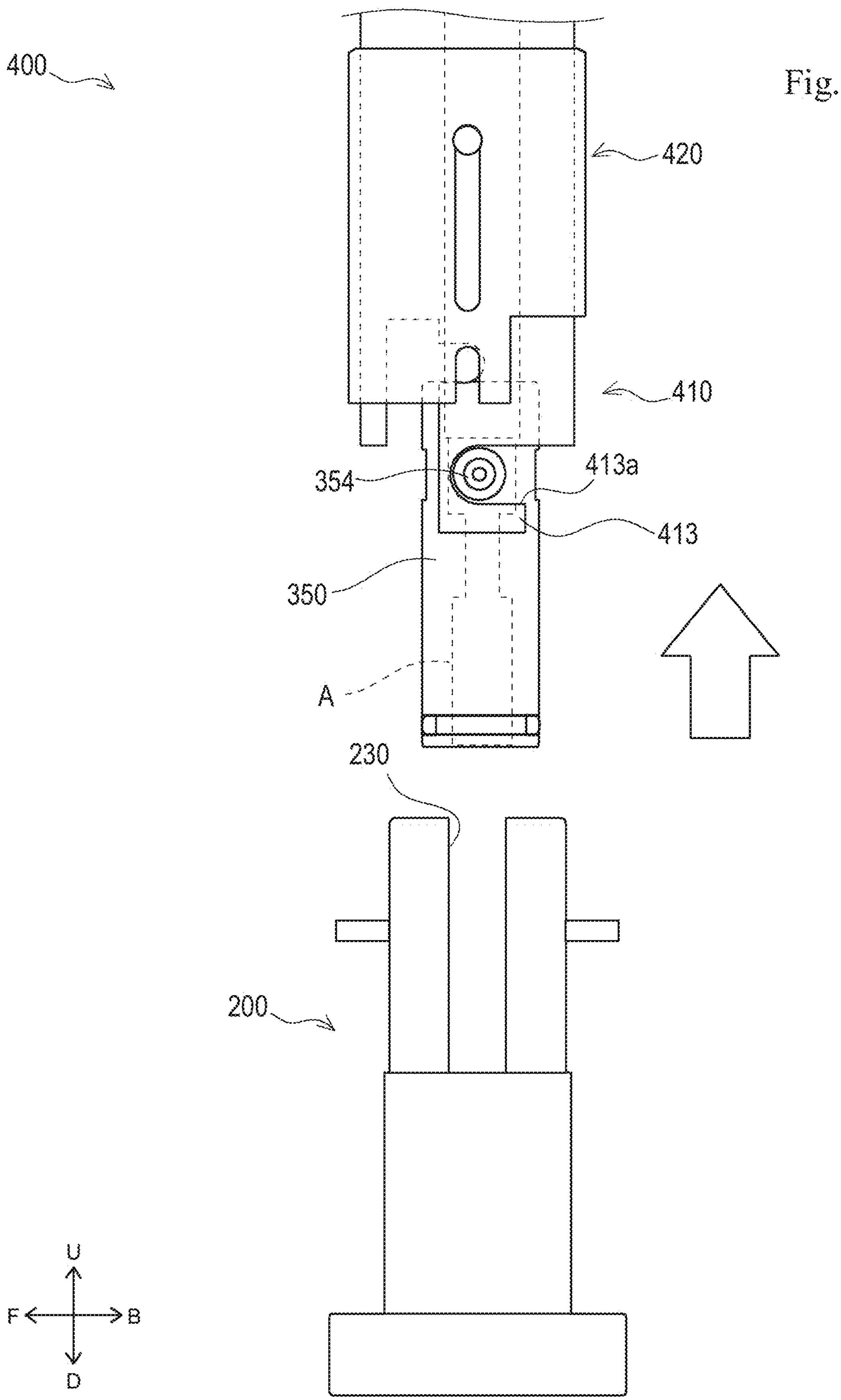
FIG. 13 is a side view showing a state in which the holder and the protective portion are being pulled up by the restriction jig.

In addition, as shown in FIG. 13, the operator pulls up the restriction jig 400 in a state where the protective portion 350 is engaged as described above. The holder 300 and the information acquisition device A can be thus detached from the mount 200. According to the above configuration, the information acquisition device A can be detached while the information acquisition device A is protected by the protective portion 350. By detaching the information acquisition device A as described above, the operator can perform maintenance such as replacement of the information acquisition device A.

Next, a method for attaching the information acquisition device A will be described. Attachment of the information acquisition device A can be performed through a procedure reverse to the method for detaching the information acquisition device A described above. Thus, in the following description, portions overlapping with the above description will be appropriately omitted.

As in the state shown in FIG. 13, the operator lowers the restriction jig 400 provided with the holder 300 and the information acquisition device A toward the mount 200, and attaches the protective portion 350 to the mount 200. Next, as shown in FIG. 9, the restriction jig 400 is rotated in the first rotational direction (clockwise) to engage the restriction jig 400 with the mount 200. In this state, the relative movement of the restriction jig 400 with respect to the mount 200 in the upward-downward direction and the rotational direction is restricted.

Next, the operator operates the valve 120 of the connection 100 to release stopping of water. The shaft 310 and the like of the holder 300 can be thus inserted into the mount 200.

Next, the operator engages the jig for attachment and detachment 500 with the fixing portion 340 of the holder 300, and screws the fixing portion 340 with respect to the restriction jig 400 so as to lower the fixing portion 340 (see FIG. 11). With the lowering, the fixing portion 340 is detached from the restriction jig 400, and then the fixing portion 340 (the portion of the holder 300 excluding the protective portion 350) is further rotated to screw the fixing portion 340 into the mount 200. The holder 300 and the information acquisition device A can be thus attached to the mount 200 (see FIGS. 1 and 10).

According to the method for attaching and detaching the information acquisition device A using the attachment device 1 as described above, the movement of the restriction jig 400 in the rotational direction and the upward-downward direction with respect to the mount 200 can be restricted only by relatively moving the restriction jig 400 with respect to the mount 200 in the rotational direction, and in this state, the holder 300 and the information acquisition device A can be easily attached and detached by using the jig for attachment and detachment 500.

In addition, according to the present example embodiment, unlike the case where the mount 200 and the holder 300 are fixed by fixing flanges using bolts, nuts, or the like, it is unnecessary to perform fastening work or the like of bolts, nuts, or the like when the holder 300 is attached or detached. Thus, the attachment device 1 can be downsized, and space saving can be achieved. In addition, with this configuration, the holder 300 can be easily attached and detached even in a narrow space such as in a valve box.

As described above, the attachment device 1 according to the present example embodiment is an attachment device to attach the information acquisition device A that acquires information in a pipe conduit (the pipe conduit 11) through which a fluid flows, the attachment device including the mount 200 to be attached to the pipe conduit (the pipe conduit 11) and including the through hole 210 communicating with the opening 11*b* formed in the pipe conduit (the pipe conduit 11), the holder 300 that is detachably attached to the mount 200 by being inserted into the through hole 210 and to which the information acquisition device A is to be attached, and a jig (the restriction jig 400) to attach and detach the holder 300 to and from the mount 200, in which the restriction jig 400 includes a first restriction portion (the first mount restriction portion 412) to engage with the mount 200 to restrict relative movement in a direction of axis of the opening 11*b* with respect to the mount 200, and a second restriction portion (the second mount restriction portion 421) to engage with the mount 200 to restrict relative movement in a rotational direction around an axis line of the opening 11*b* with respect to the mount 200, and the first mount restriction portion 412 and the second mount restriction portion 421 are engageable with the mount 200 by relatively moving the restriction jig 400 in the rotational direction with respect to the mount 200.

With such a configuration, attachment and detachment of the information acquisition device A can be suitably performed. That is, the movement of the mount 200 in the rotational direction and the direction of axis with respect to the restriction jig 400 can be restricted only by relatively moving the restriction jig 400 with respect to the mount 200 in the rotational direction, and in this state, the holder 300 can be easily attached to and detached from the mount 200 by using the restriction jig 400.

The mount 200 includes the first projection 240 projecting outward, the first mount restriction portion 412 includes the first engagement portion 412*a* that is open in the rotational direction and is engageable with the first projection 240 as the first mount restriction portion 412 moves in the rotational direction, and the second mount restriction portion 421 includes the second engagement portion 421*a* that is open downward and is engageable with the first projection 240 as the second mount restriction portion 421 moves downward in a case where positions of the second mount restriction portion 421 and the first projection 240 in the rotational direction coincide with each other.

With such a configuration, by engaging the first engagement portion 412*a* and the second engagement portion 421*a* with the first projection 240, the movement of the restriction jig 400 in the upward-downward direction and the rotational direction with respect to the mount 200 can be restricted.

The holder 300 includes the fixing portion 340 to be detachably fixed to the mount 200 by a predetermined operation, and the restriction jig 400 includes a fixed portion (the first insertion hole 411*a*) to which the fixing portion 340 detached from the mount 200 is to be detachably fixed.

With such a configuration, the holder 300 can be fixed to the restriction jig 400, and the holder 300 can be easily detached.

In the attachment device 1 according to the present example embodiment, the mount 200 includes the cutout 230 extending in the direction of axis, and the holder 300 includes the shaft 310 to which the information acquisition device A is to be attached and in which the cable Ac of the information acquisition device A can be wired, the guide 330 provided in the shaft 310 and guided along the cutout 230, and the cable outlet 331 through which the cable Ac inside the shaft 310 can be taken out to the outside of the holder 300.

With this configuration, the guide 330 is guided to the cutout 230 such that the information acquisition device A can be positioned. In addition, the guide 330 can prevent the cable Ac from being caught.

The holder 300 includes the shaft 310 to which the information acquisition device A is to be attached, and the protective portion 350 provided in the through hole 210 of the mount 200, the protective portion 350 being provided with the insertion hole 351 through which the shaft 310 and the information acquisition device A are inserted, the protective portion 350 being capable of protecting the information acquisition device A.

With such a configuration, by providing the protective portion 350, the information acquisition device A can be prevented from coming into contact with the mount 200 or the like when the holder 300 is attached or detached.

The restriction jig 400 includes a third restriction portion (the protective portion restriction portion 413) to restrict relative movement in the direction of axis with respect to the protective portion 350 in a state where the restriction jig 400 is engaged with the protective portion 350, and the protective portion restriction portion 413 is engageable with the protective portion 350 by relatively moving the restriction jig 400 in the rotational direction with respect to the protective portion 350 in a state where engagement of the first mount restriction portion 412 and the second mount restriction portion 421 with respect to the mount 200 is released.

With such a configuration, the relative movement of the protective portion 350 with respect to the restriction jig 400 in the direction of axis can be restricted only by relatively moving the restriction jig 400 with respect to the protective portion 350 in the rotational direction, and in this state, the protective portion 350 can be easily attached and detached using the restriction jig 400.

The protective portion 350 includes the second projection 354 projecting outward with respect to the mount 200, and the protective portion restriction portion 413 includes a third engagement portion (the protective portion engagement portion 413*a*) that is open in the rotational direction and is engageable with the second projection 354 as the protective portion restriction portion 413 moves in the rotational direction.

With such a configuration, by engaging the protective portion engagement portion 413*a* with the second projection 354, the movement of the protective portion 350 in the direction of axis with respect to the restriction jig 400 can be restricted.

The second projection 354 includes the pressure outlet 354*a* through which a pressure of the fluid in the pipe conduit (the pipe conduit 11) can be released.

With such a configuration, the second projection 354 can be used as a portion to extract the pressure of the fluid.

A method for attaching and detaching the information acquisition device A according to the present example embodiment is a method for attaching and detaching the information acquisition device A, the method using the attachment device 1 according to the present example embodiment, the method including engaging the first mount restriction portion 412 and the second mount restriction portion 421 with the mount 200 by rotating the restriction jig 400 in the rotational direction with respect to the mount 200, and attaching and detaching the holder 300 to and from the mount 200 in a state where the first mount restriction portion 412 and the second mount restriction portion 421 are engaged with the mount 200.

With such a configuration, attachment and detachment of the information acquisition device A can be suitably performed. The restriction jig 400 according to the present example embodiment is an example embodiment of the jig according to the present invention.

The first mount restriction portion 412 according to the present example embodiment is an example embodiment of the first restriction portion according to the present invention.

The second mount restriction portion 421 according to the present example embodiment is an example embodiment of the second restriction portion according to the present invention.

The first insertion hole 411*a* according to the present example embodiment is an example embodiment of the fixed portion according to the present invention.

The protective portion restriction portion 413 according to the present example embodiment is an example embodiment of the third restriction portion according to the present invention.

The protective portion engagement portion 413*a* according to the present example embodiment is an example embodiment of the third engagement portion according to the present invention.

The pipe conduit 11 according to the present example embodiment is an example embodiment of the pipe conduit according to the present invention.

The first example embodiment of the present invention has been described above, but the present invention is not limited to the above configuration, and various modifications can be made within the scope of the invention described in the claims.

For example, the shape and the like of the attachment device 1 described in the present example embodiment are merely examples, are not limited to the examples described above, and can be changed as appropriate. In particular, the shape of the restriction jig 400 (inner portion 410 and outer portion 420) is not limited to the above-described example, and various shapes engageable with the first projection 240 can be adopted.

In the present example embodiment, an example in which the protective portion restriction portion 413 is provided in the restriction jig 400 has been described, but the present invention is not limited to this example. For example, the protective portion restriction portion 413 does not have to be provided. In this case, the protective portion 350 does not have to be provided in the attachment device 1.

In the present example embodiment, the information acquisition device A has a configuration in which the strain gauge Ab is provided on the surface of the plate Aa, but the present invention is not limited to such an example. Any configuration can be adopted as the information acquisition device A.

In the present example embodiment, the information acquisition device A acquires the flow rate of water in a water pipe, but the present invention is not limited to such an example. For example, the information acquisition device A may acquire other various types of information such as pressure, temperature, vibration, sound, image (video), and turbidity in piping.

Here, in the case of acquiring the temperature, the image (video), and the turbidity in piping, a thermometer, a camera, or a turbidity meter may be used at the tip of the holder 300 instead of or in addition to the information acquisition device A according to the present example embodiment.

In the present example embodiment, an example in which the information acquisition device A is provided so as to be positioned in the pipe conduit 11 of the valve device 10 has been described, but the present invention is not limited to such an example. For example, the information acquisition device A may be positioned in a pipe conduit of piping (water pipe or the like).

In the present example embodiment, an example in which the attachment device 1 is attached to the valve device 10 has been described, but the present invention is not limited to such an example. For example, the attachment device 1 may be attached to a faucet or the like provided in piping (water pipe or the like).

In the present example embodiment, an example in which a water pipe is adopted as the piping in which the attachment device 1 is installed has been described, but the present invention is not limited to such an example. The attachment device 1 can be installed in various piping (pipe conduits) through which a fluid flows, such as other metal pipes and piping (resin pipes) formed of resin.

Example embodiments of the present invention are applicable to attachment devices to each of which an information acquisition device to acquire information in a pipe conduit through which a fluid flows can be attached, and methods for attaching and detaching the information acquisition device.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An attachment device capable of attaching an information acquisition device to acquire information in a pipe conduit through which a fluid flows, the attachment device comprising:

a mount to be attached to the pipe conduit and including a through hole communicating with an opening in the pipe conduit;

a holder that is detachably attached to the mount by being inserted into the through hole and to which the information acquisition device is to be attached; and a jig to attach and detach the holder to and from the mount; wherein the jig includes:

a first restriction portion to engage with the mount to restrict relative movement in a direction of axis of the opening with respect to the mount; and a second restriction portion to engage with the mount to restrict relative movement in a rotational direction around an axis line of the opening with respect to the mount; and the first restriction portion and the second restriction portion are engageable with the mount by relatively moving the jig in the rotational direction with respect to the mount.

2. The attachment device according to claim 1, wherein the mount includes a first projection projecting outward;

the first restriction portion includes a first engagement portion that is open in the rotational direction and is engageable with the first projection as the first restriction portion moves in the rotational direction; and the second restriction portion includes a second engagement portion that is open downward and is engageable with the first projection as the second restriction portion moves downward in a case where positions of the second restriction portion and the first projection in the rotational direction coincide with each other.

3. The attachment device according to claim 1, wherein the holder includes a fixing portion to be detachably fixed to the mount by a predetermined operation; and the jig includes a fixed portion to which the fixing portion detached from the mount is to be detachably fixed.

4. The attachment device according to claim 1, wherein the mount includes a cutout extending in the direction of axis; and the holder includes:

a shaft to which the information acquisition device is to be attached and structured to accommodate a cable of the information acquisition device;

a guide provided in the shaft and extending along the cutout; and a cable outlet through which the cable inside the shaft extends out to an outside of the holder.

5. The attachment device according to claim 1, wherein the holder includes:

a shaft to which the information acquisition device is to be attached; and a protective portion in the through hole of the mount and including an insertion hole through which the shaft and the information acquisition device are inserted, the protective portion being configured to protect the information acquisition device.

6. The attachment device according to claim 5, wherein the jig includes a third restriction portion to restrict relative movement in the direction of axis with respect to the protective portion in a state where the jig is engaged with the protective portion; and the third restriction portion is engageable with the protective portion by relatively moving the jig in the rotational direction with respect to the protective portion in a state where engagement of the first restriction portion and the second restriction portion with respect to the mount is released.

7. The attachment device according to claim 6, wherein the protective portion includes a second projection projecting outward with respect to the mount; and the third restriction portion includes a third engagement portion that is open in the rotational direction and is engageable with the second projection as the third restriction portion moves in the rotational direction.

8. The attachment device according to claim 7, wherein the second projection includes a pressure outlet to release a pressure of the fluid in the pipe conduit.

9. A method for attaching and detaching an information acquisition device, the method using the attachment device according to claim 1, the method comprising:

engaging the first restriction portion and the second restriction portion with the mount by rotating the jig in the rotational direction with respect to the mount; and attaching and detaching the holder to and from the mount in a state where the first restriction portion and the second restriction portion are engaged with the mount.

10. A method for attaching and detaching an information acquisition device, the method using the attachment device according to claim 2, the method comprising:

engaging the first restriction portion and the second restriction portion with the mount by rotating the jig in the rotational direction with respect to the mount; and attaching and detaching the holder to and from the mount in a state where the first restriction portion and the second restriction portion are engaged with the mount.

11. A method for attaching and detaching an information acquisition device, the method using the attachment device according to claim 3, the method comprising:

engaging the first restriction portion and the second restriction portion with the mount by rotating the jig in the rotational direction with respect to the mount; and attaching and detaching the holder to and from the mount in a state where the first restriction portion and the second restriction portion are engaged with the mount.

12. A method for attaching and detaching an information acquisition device, the method using the attachment device according to claim 4, the method comprising:

engaging the first restriction portion and the second restriction portion with the mount by rotating the jig in the rotational direction with respect to the mount; and attaching and detaching the holder to and from the mount in a state where the first restriction portion and the second restriction portion are engaged with the mount.

13. A method for attaching and detaching an information acquisition device, the method using the attachment device according to claim 5, the method comprising:

engaging the first restriction portion and the second restriction portion with the mount by rotating the jig in the rotational direction with respect to the mount; and attaching and detaching the holder to and from the mount in a state where the first restriction portion and the second restriction portion are engaged with the mount.

14. A method for attaching and detaching an information acquisition device, the method using the attachment device according to claim 6, the method comprising:

engaging the first restriction portion and the second restriction portion with the mount by rotating the jig in the rotational direction with respect to the mount; and attaching and detaching the holder to and from the mount in a state where the first restriction portion and the second restriction portion are engaged with the mount.

15. A method for attaching and detaching an information acquisition device, the method using the attachment device according to claim 7, the method comprising:

engaging the first restriction portion and the second restriction portion with the mount by rotating the jig in the rotational direction with respect to the mount; and attaching and detaching the holder to and from the mount in a state where the first restriction portion and the second restriction portion are engaged with the mount.

16. A method for attaching and detaching an information acquisition device, the method using the attachment device according to claim 8, the method comprising:

engaging the first restriction portion and the second restriction portion with the mount by rotating the jig in the rotational direction with respect to the mount; and attaching and detaching the holder to and from the mount in a state where the first restriction portion and the second restriction portion are engaged with the mount.

* * * * *